US012586776B2

(12) United States Patent
Kumagai

(10) Patent No.: US 12,586,776 B2
(45) Date of Patent: Mar. 24, 2026

---

(54) LEAD-ACID BATTERY

(71) Applicant: GS Yuasa International Ltd., Kyoto (JP)

(72) Inventor: Yusuke Kumagai, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 511 days.

(21) Appl. No.: 18/038,754

(22) PCT Filed: Oct. 28, 2021

(86) PCT No.: PCT/JP2021/039742

§ 371 (c)(1),
(2) Date: May 25, 2023

(87) PCT Pub. No.: WO2022/113622

PCT Pub. Date: Jun. 2, 2022

(65) Prior Publication Data

US 2023/0420645 A1 Dec. 28, 2023

(30) Foreign Application Priority Data

Nov. 27, 2020 (JP) ................................. 2020-197580

(51) Int. Cl.
*H01M 4/14* (2006.01)
*H01M 4/02* (2006.01)
(Continued)

(52) U.S. Cl.
CPC ............. *H01M 4/14* (2013.01); *H01M 4/583* (2013.01); *H01M 10/14* (2013.01); *H01M 2004/027* (2013.01)

(58) Field of Classification Search
CPC ......... H01M 4/14; H01M 4/583; H01M 10/14
See application file for complete search history.

(56) References Cited

U.S. PATENT DOCUMENTS 9,117,596 B2 8/2015 Loganathan et al.
2003/0235759 A1 12/2003 Honbo et al.
(Continued)

FOREIGN PATENT DOCUMENTS

CN 107732162 A 2/2018
EP 2770574 A1 8/2014
(Continued)

OTHER PUBLICATIONS

International Search Report (ISR) dated Dec. 7, 2021 filed in PCT/JP2021/039742.

*Primary Examiner* — Sarah A. Slifka
(74) *Attorney, Agent, or Firm* — RANKIN, HILL & CLARK LLP

(57) ABSTRACT

A lead-acid battery includes at least one cell including an element and an electrolyte solution. The element includes a positive electrode plate, a negative electrode plate, and a separator interposed between the negative electrode plate and the positive electrode plate. The negative electrode plate includes a negative electrode material. The negative electrode material includes a nonionic surfactant including one or more hydrophobic groups and one or more hydrophilic groups. At least one of the hydrophobic groups is a long-chain aliphatic hydrocarbon group having 8 or more carbon atoms. A content of the nonionic surfactant in the negative electrode material is 8 ppm or more on a mass basis.

10 Claims, 1 Drawing Sheet

(51) Int. Cl.
  H01M 4/583 (2010.01)
  H01M 10/14 (2006.01)

(56) References Cited

U.S. PATENT DOCUMENTS

| | | |
|---|---|---|
| 2014/0356729 A1 | 12/2014 | Fitter |
| 2016/0118694 A1 | 4/2016 | Fitter |
| 2021/0036308 A1 | 2/2021 | Tsujinaka |
| 2022/0200007 A1 | 6/2022 | Kagohashi et al. |

FOREIGN PATENT DOCUMENTS

| | | |
|---|---|---|
| JP | 51-47237 A | 4/1976 |
| JP | 54-102533 A | 8/1979 |
| JP | 56-52875 A | 5/1981 |
| JP | S58-119160 A | 7/1983 |
| JP | S60-182662 A | 9/1985 |
| JP | 5-28997 A | 2/1993 |
| JP | 8-78045 A | 3/1996 |
| JP | 8-185886 A | 7/1996 |
| JP | 9-147869 A | 6/1997 |
| JP | 10-21923 A | 1/1998 |
| JP | 10-208746 A | 8/1998 |
| JP | 10-223213 A | 8/1998 |
| JP | 10-302785 A | 11/1998 |
| JP | 11-40160 A | 2/1999 |
| JP | 2003-230982 A | 8/2003 |
| JP | 2004-22440 A | 1/2004 |
| JP | 2008-152973 A | 7/2008 |
| JP | 2012-043594 A | 3/2012 |
| JP | 2016-1618 A | 1/2016 |
| JP | 2016-524288 A | 8/2016 |
| JP | 2017-183241 A | 10/2017 |
| WO | 2010/058240 A1 | 5/2010 |
| WO | 2013/046499 A1 | 4/2013 |
| WO | 2013/058058 A1 | 4/2013 |
| WO | 2013/148893 A1 | 10/2013 |
| WO | 2016/068281 A1 | 5/2016 |
| WO | 2018/105005 A1 | 6/2018 |
| WO | 2019090887 A1 | 5/2019 |
| WO | 2019/198491 A1 | 10/2019 |
| WO | 2020/241878 A1 | 12/2020 |

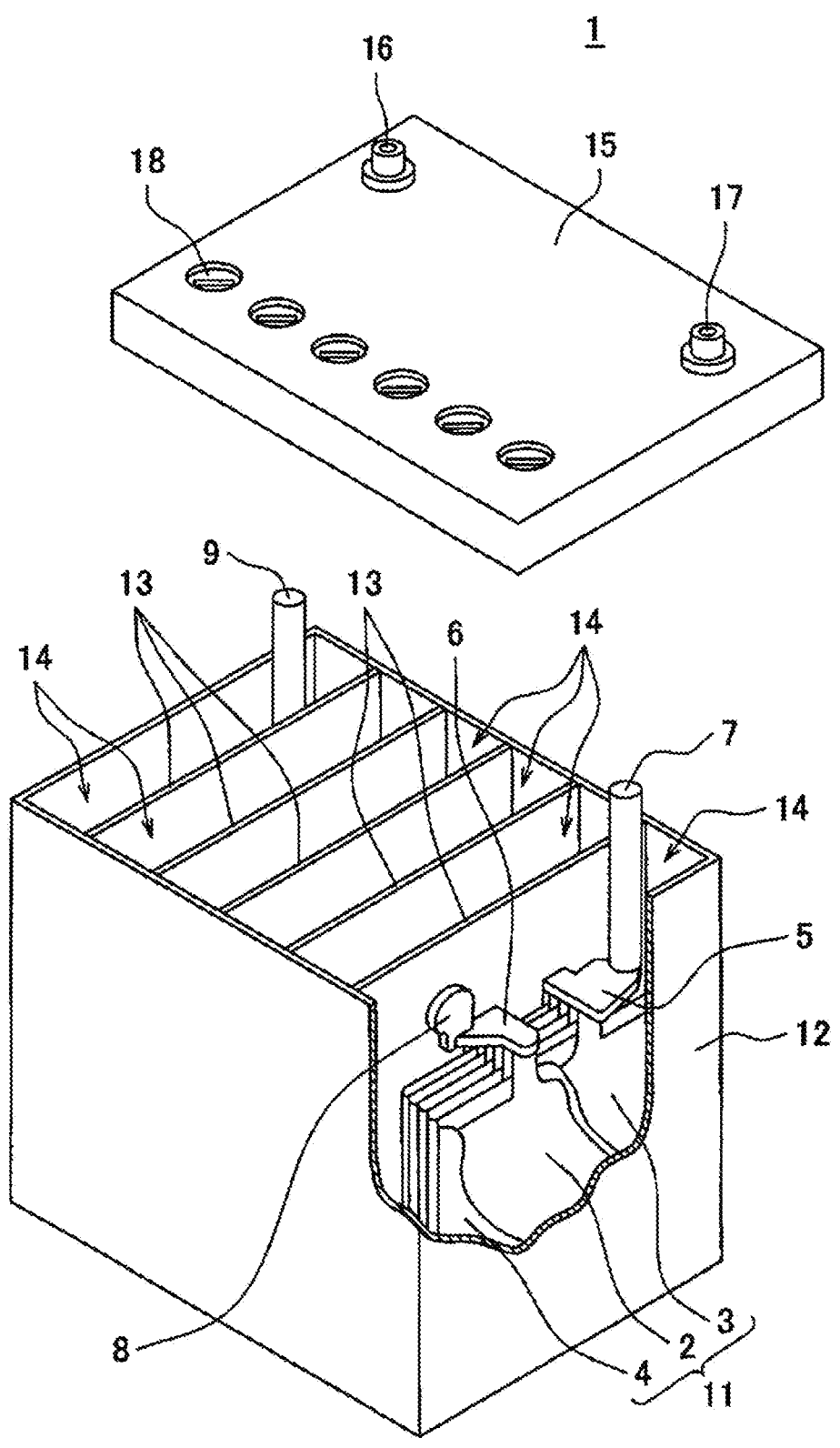

LEAD-ACID BATTERY

TECHNICAL FIELD

The present invention relates to a lead-acid battery.

BACKGROUND ART

Lead-acid batteries are in use for various applications, including automotive and industrial applications. The lead-acid batteries include a negative electrode plate, a positive electrode plate, a separator (or mat), an electrolyte solution, and the like. An additive may be added to constituent members of the lead-acid battery from the viewpoint of imparting various functions.

Patent Document 1 discloses a flooded-type lead-acid battery including a negative electrode plate formed by filling a negative electrode current collector with a negative active material, and a positive electrode plate formed by filling a positive electrode current collector with a positive active material, which are stacked via a separator to form an element, the element being stored in a battery container with an electrolyte solution, charge being intermittently performed, and high rate discharge to the load being performed under a partial state of charge, in which at least a carbonaceous conductive material and an organic compound suppressing coarsening of the negative active material accompanied by charge and discharge are added to the negative active material, the positive electrode plate is configured to set a positive active material total surface area $[m^2]$ per unit element volume $[cm^3]$ to be in a range between 3.5 and 15.6 $[m^2/cm^3]$, and compound(s) chosen from among a cationic coagulant, a cationic surfactant, and a phosphoric acid are added to the electrolyte solution.

Patent Document 2 proposes a lead-acid battery in which a copolymer of propylene oxide and ethylene oxide was added to a negative electrode plate and a substance in combination with lignin sulfonate.

Patent Document 3 proposes an enhanced performance rechargeable electrochemical energy storage cell, the cell including a case, at least one positive electrode with a positive connector, and at least one negative electrode with a negative connector, the electrodes disposed in the case, the case containing an acidic electrolyte. The case includes an amount of isolated or synthesized performance enhancing supplement that is incorporated into at least one component of the rechargeable electrochemical energy storage cell selected from the group consisting of the case, the at least one negative electrode, at least one separator adapted to be positioned between the at least one positive electrode and the at least one negative electrode, the acidic electrolyte, and combinations thereof to form a treated cell. There has been proposed a performance enhancing rechargeable electrochemical energy storage cell in which application of an electric potential to both ends of the connector sufficient to cause an electric current to flow between the positive and negative connectors of the rechargeable electrochemical energy storage cell effects at least one performance enhancement of the rechargeable electrochemical energy storage cell selected from the group consisting of a reduction of metal transfer within the treated cell, a reduction of gas evolution from the treated cell, a reduction in water consumption by the treated cell, an increase in on-charge potential of the treated cell, a reduction in corrosion of the positive electrode of the treated cell, a reduction in self discharge of the treated cell, and combinations thereof, when compared to performance of an untreated cell.

Patent Document 4 proposes a lead-acid battery recovering agent in which polyoxyethylene fatty acid methyl ester and a silicone emulsion are mixed with a carbon nanotube aqueous dispersion liquid in which 0.2 to 0.5 parts by mass of carbon nanotube powder is dispersed with respect to 100 parts by mass of water.

PRIOR ART DOCUMENTS

Patent Documents

Patent Document 1: WO 2013/058058 A
Patent Document 2: JP-A-60-182662
Patent Document 3: JP-W-2016-524288
Patent Document 4: WO 2016/068281 A

SUMMARY OF THE INVENTION

Problems to be Solved by the Invention

When a surface of lead contained in a negative electrode material is covered with an organic additive, a reductive reaction of hydrogen ions hardly occurs during overcharge; therefore, an amount of overcharge tends to decrease, and a decrease in the electrolyte solution can be reduced. On the other hand, when the lead surface is covered with the organic additive, lead sulfate generated during discharge is hardly eluted during charge, so that charge acceptability is deteriorated. Thus, it is difficult to suppress the deterioration of the charge acceptability while reducing the amount of overcharge.

Means for Solving the Problems

One aspect of the present invention is a lead-acid battery including at least one cell including an element and an electrolyte solution, in which the element includes a positive electrode plate, a negative electrode plate, a separator interposed between the negative electrode plate and the positive electrode plate, the negative electrode plate includes a negative electrode material, the negative electrode material contains a nonionic surfactant including one or more hydrophobic groups and one or more hydrophilic groups, at least one of the hydrophobic groups is a long-chain aliphatic hydrocarbon group having 8 or more carbon atoms, and a content of the nonionic surfactant in the negative electrode material is 8 ppm or more on a mass basis.

BRIEF DESCRIPTION OF THE DRAWINGS

FIG. 1 is a partially cutaway exploded perspective view showing an appearance and an internal structure of a lead-acid battery according to one aspect of the present invention.

MODE FOR CARRYING OUT THE INVENTION

The lead-acid battery is sometimes used in a poor charged state called partial state of charge (PSOC). For example, lead-acid batteries mounted on idling stop start (ISS) vehicles are used in the PSOC. When the lead-acid battery is repeatedly charged and discharged in the PSOC, lead sulfate is likely to accumulate, and the life performance is likely to deteriorate. In order to suppress accumulation of lead sulfate, high charge acceptability is required.

In general, in the lead-acid battery, the reaction during overcharge is greatly affected by a reductive reaction of hydrogen ions at an interface between lead and an electrolyte solution. When an organic additive is contained in a negative electrode material of the lead-acid battery, the organic additive adheres to the surface of lead as an active material. When the lead surface is covered with the organic additive, the reductive reaction of hydrogen ions hardly occurs, and therefore, an amount of overcharge tends to decrease. However, the organic additive also adheres to the surface of lead sulfate generated during discharge, and lead sulfate is hardly eluted during charge, thereby deteriorating the charge acceptability. Therefore, suppression of deterioration of the charge acceptability and reduction in the amount of overcharge are in a trade-off relationship, and it has been conventionally difficult to achieve both simultaneously. In addition, when the organic additive is unevenly distributed in lead pores, it is necessary to increase a content of the organic additive in the negative electrode material in order to secure a sufficient effect of reducing the amount of overcharge. However, in general, when the content of the organic additive is increased, the charge acceptability is greatly deteriorated.

In the lead-acid battery, in general, since a sulfuric acid aqueous solution is used as an electrolyte solution, when an organic additive (oil, polymer, organic expander, or the like) is contained in a negative electrode material, it becomes difficult to balance elution into the electrolyte solution and adsorption to lead. For example, when an organic additive having low adsorptivity to lead is used, elution into the electrolyte solution becomes easy, so that the amount of overcharge is hardly reduced. On the other hand, when an organic additive having high adsorptivity to lead is used, it is difficult to thinly adhere the organic additive to the lead surface, and the organic additive tends to be unevenly distributed in the lead pores.

When the organic additive is unevenly distributed in the lead pores, movement of ions (such as lead ions and sulfate ions) is inhibited by steric hindrance of the unevenly distributed organic additive. Thus, the charge-discharge reaction is likely to be inhibited. When the content of the organic additive is increased in order to secure a sufficient effect of reducing the amount of overcharge, movement of ions in the pores is further inhibited, so that the charge-discharge reaction is further inhibited. When the charge-discharge reaction is inhibited, the charge acceptability is deteriorated or discharge performance is deteriorated.

In view of the above, a lead-acid battery according to one aspect of the present invention includes at least one cell including an element and an electrolyte solution. The element includes a positive electrode plate, a negative electrode plate, and a separator interposed between the positive electrode plate and the negative electrode plate. The negative electrode plate includes a negative electrode material. The negative electrode material includes a nonionic surfactant including one or more hydrophobic groups and one or more hydrophilic groups. At least one of the hydrophobic groups is a long-chain aliphatic hydrocarbon group having 8 or more carbon atoms. The content of the nonionic surfactant in the negative electrode material is 8 ppm or more on a mass basis.

In the present specification, a nonionic surfactant which includes one or more hydrophobic groups and one or more hydrophilic groups and in which at least one of the hydrophobic groups is a long-chain aliphatic hydrocarbon group having 8 or more carbon atoms may be referred to as a first surfactant.

In the lead-acid battery according to one aspect of the present invention, the negative electrode material contains the first surfactant in an amount of 8 ppm or more on a mass basis. With such a configuration, it is possible to reduce the amount of overcharge while securing high charge acceptability. Since suppression of hydrogen generation during overcharge can reduce the amount of decrease in the electrolyte solution, it is advantageous for prolonging the life of the lead-acid battery.

In the lead-acid battery according to one aspect of the present invention, it is considered that the amount of overcharge can be reduced while securing high charge acceptability for the following reasons. First, due to the action of the hydrophilic group of the first surfactant, high adsorptivity to lead can be secured. Meanwhile, the action of the long-chain aliphatic hydrocarbon group having 8 or more carbon atoms suppresses excessive coating of the lead surface with the first surfactant. Thus, a wide region of the lead surface is thinly and widely covered with the first surfactant. As a result, a hydrogen overvoltage increases, and a side reaction in which hydrogen is generated during overcharge hardly occurs, so that the amount of overcharge can be reduced. Since the effect of reducing the amount of overcharge is obtained even when the negative electrode material contains a very small amount of the first surfactant, it is considered that when the first surfactant is contained in the negative electrode material, the first surfactant can be present near lead, whereby a high adsorption action of the first surfactant on lead is exerted. Since the negative electrode material contains the first surfactant, the first surfactant is likely to adhere to the surface of lead sulfate generated during discharge, and therefore, solubility of lead sulfate during charge tends to decrease. However, since a thickness of a coating film of the first surfactant covering the surfaces of lead and lead sulfate is thin, a degree to which dissolution of lead sulfate and transfer of electrons occurring when lead ions are reduced to lead are inhibited by the coating film of the first surfactant during charge is reduced. Since the coating film of the first surfactant is thin and uneven distribution is suppressed, steric hindrance due to the coating film of the first surfactant is reduced, and therefore, hindrance of movement of lead ions in pores of the negative electrode material is reduced. Thus, a high diffusion rate of lead ions is maintained. As a result, it is considered that even when the negative electrode material contains the first surfactant which is an organic additive, the inhibition of the charge-discharge reaction can be reduced, and the deterioration of the charge acceptability is suppressed.

The effect of reducing the amount of overcharge is exhibited by covering the surface of lead in the negative electrode material with the first surfactant. Thus, it is important that the first surfactant is present near lead in the negative electrode material, whereby the effect of the first surfactant can be effectively exhibited. Thus, it is important that the negative electrode material contains the first surfactant in the specific content as described above regardless of whether or not a component of the lead-acid battery other than the negative electrode material contains the first surfactant.

The HLB of the first surfactant is preferably 4 or more. In this case, higher adsorptivity of the first surfactant to the lead surface in the negative electrode material is easily obtained. Although the negative electrode material may contain a carbonaceous material, when the HLB of the first surfactant is 4 or more, adsorption of the first surfactant to the carbonaceous material is reduced, and adsorption to the lead surface is likely to occur. Thus, the amount of overcharge can be further reduced.

The HLB of the first surfactant is preferably 18 or less. In this case, excessive adsorption of the first surfactant to the lead surface in the negative electrode material is easily suppressed, so that uneven distribution of the first surfactant can be further reduced. Thus, higher charge acceptability can be secured.

The first surfactant preferably contains a fatty acid ester of a hydroxy compound. In this case, a low amount of overcharge and a high charge acceptability can be secured in a well-balanced manner. The long-chain aliphatic hydrocarbon group is derived from a fatty acid of a fatty acid ester.

In the first surfactant, it is preferable that at least one of the hydrophilic groups contains a polyoxyethylene chain. The high hydrophilicity of the polyoxyethylene chain can further enhance the adsorptivity to the lead surface. Meanwhile, the polyoxyethylene chain makes it easy for the first surfactant to have a linear structure, and the balance between hydrophobicity and hydrophilicity makes it possible to further reduce the thickness of the coating film of the first surfactant on the lead surface. Thus, it is possible to secure a higher charge acceptability while reducing the amount of overcharge.

It is also preferable that the first surfactant contains at least one selected from the group consisting of a fatty acid ester of polyethylene glycol, a fatty acid ester of a polyethylene oxide adduct of a polyol, and a fatty acid ester of a polyol. In this case, a low amount of overcharge and a high charge acceptability can be secured in a well-balanced manner.

The number of carbon atoms of the long-chain aliphatic hydrocarbon group in the first surfactant is preferably 26 or less. In this case, higher adsorptivity of the first surfactant to the lead surface in the negative electrode material can be secured. Although the negative electrode material may contain a carbonaceous material, when the number of carbon atoms of the long-chain aliphatic hydrocarbon group is 26 or less, adsorption of the first surfactant to the carbonaceous material is reduced, and adsorption to the lead surface is likely to occur. Thus, the amount of overcharge can be further reduced.

As described above, the first surfactant can thinly cover the lead surface while having high adsorptivity to lead due to the action of the hydrophilic group and the hydrophobic group of the first surfactant. Thus, even when the content of the first surfactant in the negative electrode material is small, the amount of overcharge can be reduced. Since a sufficient effect of reducing the amount of overcharge can be secured even if the content is small, it is also possible to suppress the deterioration of the charge acceptability. From the viewpoint of easily securing higher charge acceptability, the content of the first surfactant in the negative electrode material is preferably 600 ppm or less on a mass basis. From the viewpoint of securing a higher effect of reducing the amount of overcharge, the content of the first surfactant in the negative electrode material is preferably 50 ppm or more.

In the present specification, the content of the first surfactant in the negative electrode material is determined for the negative electrode plate taken out from the lead-acid battery in a full charge state.

In the lead-acid battery, it is sufficient that the first surfactant can be contained in the negative electrode material at a predetermined content, and the source of the first surfactant contained in the negative electrode material is not particularly limited. The first surfactant may be contained in any of the components (for example, a negative electrode plate, a positive electrode plate, an electrolyte solution, and a separator) of the lead-acid battery when preparing the lead-acid battery. The first surfactant may be contained in one constituent element, or may be contained in two or more constituent elements (for example, a negative electrode plate and an electrolyte solution).

The negative electrode material preferably contains a condensate of a bisarene compound. The condensate of the bisarene compound corresponds to an organic expander. When the negative electrode material contains an organic expander, high discharge performance is easily obtained. The condensate of the bisarene compound is generally classified as a synthetic organic expander. When the negative electrode material contains the condensate of the bisarene compound, the specific surface area of the negative electrode material increases, and therefore, the amount of overcharge tends to increase. However, even in such a case, the amount of overcharge can be suppressed to a low level by the action of the first surfactant. In addition, by using the condensate of the bisarene compound, uneven distribution of the organic expander on the lead surface is reduced as compared with the case of using the lignin compound, and thus higher charge acceptability is easily obtained. When the condensate of the bisarene compound is used, even when the lead-acid battery is charged and discharged at a high temperature, deterioration of the negative electrode plate is suppressed, and high discharge performance can be secured.

The lead-acid battery may be either a valve regulated (sealed) lead-acid battery (VRLA type lead-acid battery) or a flooded-type (vented type) lead-acid battery.

(Description of Terminology)

(Electrode Material)

The negative electrode material and a positive electrode material included in the positive electrode plate are each usually held by a current collector. The electrode material is a part obtained by removing the current collector from the plate. A member such as a mat or a pasting paper may be stuck to the plate. Such a member (also referred to as a sticking member) is used integrally with the plate and is thus included in the plate. When the plate includes the sticking member (such as a mat or a pasting paper), the electrode material is a part obtained by removing the current collector and the sticking member from the plate.

In the positive electrode plate, the clad-type positive electrode plate includes a plurality of porous tubes, a spine inserted into each tube, a current collector coupling the plurality of spines, a positive electrode material with which a spine inserted tube is filled, and a joint (spine protector) that couples the plurality of tubes. In the clad-type positive electrode plate, the positive electrode material is a part obtained by removing the tube, the spine, the current collector, and the joint (spine protector) from the plate. In the clad-type positive electrode plate, the spine and the current collector may be collectively referred to as a positive electrode current collector.

(Hydrophobic Group and Hydrophilic Group of First Surfactant)

The first surfactant is a nonionic surfactant. Thus, the hydrophilic group of the first surfactant is a hydrophilic group that does not dissociate into ions in an aqueous solution of the first surfactant. Such hydrophilic groups include, for example, hydroxy groups (such as alcoholic hydroxy groups) and polyether chains. The hydrophobic group of the first surfactant is a functional group having higher hydrophobicity than the hydrophilic group. At least one of the hydrophobic groups of the first surfactant may be a long-chain aliphatic hydrocarbon group having 8 or more carbon atoms.

(HLB)

HLB stands for Hydrophile Lipophile Balance, and is a numerical value representing the balance between hydrophobicity and hydrophilicity of a surfactant (predominantly a nonionic surfactant). The HLB value of the polymer compound (P) is determined by a Griffin method.

(Organic Expander)

The organic expander refers to an organic compound among compounds having a function of suppressing shrinkage of lead as a negative active material when charge-discharge of the lead-acid battery is repeated. The organic expander often contains elemental sulfur.

(Content of Sulfur Element in Organic Expander)

The sulfur element content in the organic expander being X µmol/g means that the content of the sulfur element contained per 1 g of the organic expander is X µmol.

(Condensate of Bisarene Compound)

The condensate of the bisarene compound is a condensate containing a unit of the bisarene compound. The unit of the bisarene compound refers to a unit derived from the bisarene compound incorporated in a condensate. The bisarene compound is a compound in which two sites each having an aromatic ring are linked via a single bond or a linking group.

(Number Average Molecular Weight)

In the present specification, a number average molecular weight (Mn) is determined by gel permeation chromatography (GPC). A standard substance used for determining the Mn is polyethylene glycol.

(Weight Average Molecular Weight)

In the present specification, a weight average molecular weight (Mw) is determined by GPC. A standard substance used for determining the Mw is sodium polystyrene sulfonate.

(Full Charge State)

The full charge state of the flooded-type lead-acid battery is defined by the definition of JIS D 5301: 2019. More specifically, the full charge state is a state where the lead-acid battery is charged in a water bath at 25° C.±2° C. at a current (A) 0.2 times as large as a numerical value (numerical value whose unit is Ah) described as a rated capacity until a terminal voltage (V) during charge measured every 15 minutes or an electrolyte solution density subjected to temperature correction to 20° C. exhibits a constant value at three significant digits continuously three times. In the case of a valve regulated lead-acid battery, the full charge state is a state where the lead-acid battery is subjected to constant current constant voltage charge of 2.23 V/cell at the current (A) 0.2 times as large as the numerical value (numerical value whose unit is Ah) described as the rated capacity in an air tank of 25° C.±2° C., and the charge is completed when the charge current during constant voltage charge becomes a value (A) of 0.005 times as large as the numerical value (numerical value whose unit is Ah) described in the rated capacity.

The lead-acid battery in the full charge state refers to a lead-acid battery obtained by fully charging a formed lead-acid battery. The full charge of the lead-acid battery may be performed immediately after formation so long as being performed after formation or may be performed after the lapse of time from formation (e.g., a lead-acid battery in use (preferably at the initial stage of use) after formation may be fully charged). The battery at the initial stage of use refers to a battery that has not been used for a long time and has hardly deteriorated.

(Up-Down Direction of Lead-Acid Battery or Components of Lead-Acid Battery)

In the present specification, the up-down direction of the lead-acid battery or components (such as plate, container, and separator) of the lead-acid battery means the up-down direction of the lead-acid battery in the vertical direction when the lead-acid battery is in use. Each of the positive electrode plate and the negative electrode plate includes a lug for connecting to an external terminal. In a horizontal valve regulated lead-acid battery or the like, the lug may be provided at a side portion of the plate so as to protrude laterally; however, in many lead-acid batteries, the lug is usually provided at an upper portion of the plate so as to protrude upward.

Hereinafter, the lead-acid battery according to an embodiment of the present invention will be described for each of the main constituent elements, but the present invention is not limited to the following embodiment.

[Lead-Acid Battery]

(Negative Electrode Plate)

The negative electrode plate usually includes a negative electrode current collector in addition to a negative electrode material.

(Negative Electrode Current Collector)

The negative electrode current collector may be formed by casting lead (Pb) or a lead alloy, or may be formed by processing a lead sheet or a lead alloy sheet. Examples of the processing method include expanding processing and punching processing. It is preferable to use the grid-like current collector as the negative electrode current collector because it is easy to support the negative electrode material.

The lead alloy used for the negative electrode current collector may be any of a Pb—Sb-based alloy, a Pb—Ca-based alloy, and a Pb—Ca—Sn-based alloy. The lead or lead alloys may further contain, as an additive element, at least one selected from the group consisting of Ba, Ag, Al, Bi, As, Se, Cu, and the like. The negative electrode current collector may include a surface layer. The surface layer and the inner layer of the negative electrode current collector may have different compositions. The surface layer may be formed in a part of the negative electrode current collector. The surface layer may be formed in the lug of the negative electrode current collector. The surface layer of the lug may contain Sn or a Sn alloy.

(Negative Electrode Material)

The negative electrode material contains the first surfactant. The negative electrode material further contains a negative active material (specifically, lead or lead sulfate) that exhibits a capacity through a redox reaction. The negative electrode material may contain at least one selected from the group consisting of an organic expander, a carbonaceous material, and other additives. Examples of the additive include barium sulfate, fibers (such as resin fibers), and surfactants other than the first surfactant (which may be referred to as second surfactants). However, the additive is not limited thereto. Although the negative active material in the charged state is spongy lead, the non-formed negative electrode plate is usually prepared using lead powder.

(First Surfactant)

Examples of the hydrophilic group of the first surfactant include a hydroxy group and a polyether chain as described above. Examples of the polyether chain include a polyoxy $C_{2-4}$ alkylene chain. The polyoxy $C_{2-4}$ alkylene chain is a site having a repeating structure of an oxy $C_{2-4}$ alkylene unit. One polyether chain may include one oxy $C_{2-4}$ alkylene unit and may include two or more oxy $C_{2-4}$ alkylene units. Examples of the oxy $C_{2-4}$ alkylene unit include an oxyethylene unit, an oxypropylene unit, an oxytrimethylene unit, and an oxybutylene unit. The hydrophilic group preferably contains an oxyethylene unit and more preferably contains a polyoxyethylene chain from the viewpoint of high hydrophilicity and easy obtainment of high adsorptivity to lead.

The first surfactant only needs to include at least one hydrophilic group, and may include two or more hydrophilic groups. From the viewpoint of easily obtaining high adsorptivity to lead, the first surfactant preferably contains at least a polyether chain. In particular, when the first surfactant contains a polyoxy $C_{2-4}$ alkylene chain as a polyether chain, the first surfactant easily has a linear structure. Thus, it is possible to reduce the thickness of the coating film of the first surfactant formed on the lead surface while securing high adsorptivity to lead. The first surfactant may include at least one polyether chain and at least one hydroxy group. The hydroxy group may be located at the end of the first surfactant. The upper limit of the number of hydrophilic groups in the first surfactant is not particularly limited, and may be, for example, 6 or less (or 4 or less).

The number of hydrophilic groups in the first surfactant may be 1 or more and 6 or less (or 4 or less), or 2 or more and 6 or less (or 4 or less).

In one polyoxy $C_{2-4}$ alkylene chain, the number of repetitions of the oxy $C_{2-4}$ alkylene unit is, for example, 2 or more, and may be 5 or more. In one polyoxy $C_{2-4}$ alkylene chain, the number of repetitions of the oxy $C_{2-4}$ alkylene unit is, for example, 300 or less, and may be 200 or less, 50 or less, 20 or less, or 10 or less.

In one polyoxy $C_{2-4}$ alkylene chain, the number of repetitions of the oxy $C_{2-4}$ alkylene unit may be 2 or more (or 5 or more) and 300 or less, 2 or more (or 5 or more) and 200 or less, 2 or more (or 5 or more) and 50 or less, 2 or more (or 5 or more) and 20 or less, or 2 or more (or 5 or more) and 10 or less.

At least one of the hydrophobic groups of the first surfactant is a long-chain aliphatic hydrocarbon group having 8 or more carbon atoms. The long-chain aliphatic hydrocarbon group having 8 or more carbon atoms of the first surfactant may be referred to as a first hydrophobic group. The first surfactant may include one or more hydrophobic groups (also referred to as second hydrophobic groups) other than the first hydrophobic group. The upper limit of the number of the first hydrophobic groups in the first surfactant is not particularly limited, and may be, for example, 4 or less (or 3 or less) or 2 or less. The number of the second hydrophobic groups is not particularly limited, and may be, for example, 4 or less (or 3 or less) or 2 or less.

When the first surfactant includes two or more first hydrophobic groups, the types of at least two first hydrophobic groups may be the same, or all the first hydrophobic groups may be different. When the first surfactant includes two or more second hydrophobic groups, the types of at least two second hydrophobic groups may be the same, or all the second hydrophobic groups may be different.

The first hydrophobic group may be a saturated hydrocarbon group or an unsaturated hydrocarbon group. The first hydrophobic group may be either linear or branched. Examples of the first hydrophobic group include an alkyl group and an alkenyl group. The first hydrophobic group may be a dienyl group having two carbon-carbon double bonds, a trienyl group having three carbon-carbon double bonds, or the like. From the viewpoint of more easily reducing the thickness of the coating film of the first surfactant formed on the lead surface, the first hydrophobic group is preferably an alkyl group or an alkenyl group.

The number of carbon atoms in the first hydrophobic group may be 8 or more. From the viewpoint of still more easily reducing the thickness of the coating film of the first surfactant formed on the lead surface, the number of carbon atoms in the first hydrophobic group is preferably 10 or more, more preferably 11 or more, and may be 14 or more, 16 or more, or 17 or more. The number of carbon atoms of the first hydrophobic group is, for example, 30 or less. The number of carbon atoms of the first hydrophobic group is preferably 26 or less, more preferably 24 or less, or 22 or less from the viewpoint of easily securing high adsorptivity of the first surfactant to the lead surface due to the balance with the hydrophilic group.

The number of carbon atoms of the first hydrophobic group may be 8 or more and 30 or less (or 26 or less), 10 or more and 30 or less (or 26 or less), 11 or more and 30 or less (or 26 or less), 14 or more and 30 or less (or 26 or less), 16 or more and 30 or less (or 26 or less), 17 or more and 30 or less (or 26 or less), 8 or more and 24 or less (or 22 or less), 10 or more and 24 or less (or 22 or less), 11 or more and 24 or less (or 22 or less), 14 or more and 24 or less (or 22 or less), 16 or more and 24 or less (or 22 or less), or 17 or more and 24 or less (or 22 or less).

Specific examples of the alkyl group include 2-ethylhexyl, n-octyl, n-nonyl, n-decyl, i-decyl, undecyl, lauryl, tridecyl, myristyl, pentadecyl, cetyl, heptadecyl, stearyl, icosyl, henicosyl, and behenyl. Specific examples of the alkenyl group include cis-9-heptadecene-1-yl, palmitoleyl, and oleyl.

Examples of the second hydrophobic group include a hydrocarbon group. The hydrocarbon group includes a hydrocarbon group having a substituent (for example, a hydroxy group, an alkoxy group, and/or a carboxy group). The hydrocarbon group may be any of aliphatic, alicyclic, and aromatic. The aliphatic hydrocarbon group may have, as a substituent, at least one selected from the group consisting of an aromatic hydrocarbon group (for example, a phenyl group, a tolyl group, and a naphthyl group) and an alicyclic hydrocarbon group (for example, a cyclopentyl group and a cyclohexyl group). Examples of the aliphatic hydrocarbon group having such a substituent include a benzyl group, a phenethyl group, and a cyclohexylmethyl group. The number of carbon atoms of the aromatic hydrocarbon group and the alicyclic hydrocarbon group as the substituent is, for example, 5 or more and 20 or less, and may be 6 or more and 12 or less. The aromatic hydrocarbon group and the alicyclic hydrocarbon group may include an aliphatic hydrocarbon group (for example, an alkyl group, an alkenyl group, or an alkynyl group) as a substituent. The number of carbon atoms of the aliphatic hydrocarbon group as a substituent may be, for example, 1 to 30, 1 to 20, 1 to 10, 1 to 6, or 1 to 4.

Examples of the aromatic hydrocarbon group include aromatic hydrocarbon groups having 24 or less carbon atoms (for example, 6 to 24). The number of carbon atoms of the aromatic hydrocarbon group may be 20 or less (for example, 6 to 20), 14 or less (for example, 6 to 14), or 12 or less (for example, 6 to 12). Examples of the aromatic hydrocarbon group include an aryl group, and a bisaryl group. Examples of the aryl group include a phenyl group and a naphthyl group. Examples of the bisaryl group include monovalent groups corresponding to bisarene. Examples of the bisarene include biphenyl and bisarylalkanes (for example, bis $C_{6-10}$ aryl $C_{1-4}$ alkanes (such as 2,2-bisphenylpropane)).

Examples of the alicyclic hydrocarbon group include alicyclic hydrocarbon groups having 16 or less carbon atoms. The alicyclic hydrocarbon group may be a bridged cyclic hydrocarbon group. The number of carbon atoms of the alicyclic hydrocarbon group may be 10 or less or 8 or less. The number of carbon atoms of the alicyclic hydrocarbon group is, for example, 5 or more, and may be 6 or more.

The number of carbon atoms of the alicyclic hydrocarbon group may be 5 (or 6) or more and 16 or less, 5 (or 6) or more and 10 or less, or 5 (or 6) or more and 8 or less.

Examples of the alicyclic hydrocarbon group include cycloalkyl groups (such as cyclopentyl group, cyclohexyl group, and cyclooctyl group), and cycloalkenyl groups (such as cyclohexenyl group and cyclooctenyl group). The alicyclic hydrocarbon group also includes hydrogenated products of the aromatic hydrocarbon groups.

Among the hydrocarbon groups, an aliphatic hydrocarbon group is preferable from the viewpoint that the first surfactant easily adheres thinly to the lead surface. Examples of the aliphatic hydrocarbon group include alkyl groups, alkenyl groups, alkynyl groups, and dienyl groups. The aliphatic hydrocarbon group may be either linear or branched.

The number of carbon atoms of the aliphatic hydrocarbon group is less than 8, and may be 7 or less or 6 or less. The lower limit of the number of carbon atoms is 1 or more for an alkyl group, 2 or more for an alkenyl group and an alkynyl group, and 3 or more for a dienyl group, depending on the type of the aliphatic hydrocarbon group. The second hydrophobic group is preferably an alkyl group or an alkenyl group.

Specific examples of the alkyl group include methyl, ethyl, n-propyl, i-propyl, n-butyl, i-butyl, s-butyl, t-butyl, n-pentyl, neopentyl, i-pentyl, s-pentyl, 3-pentyl, t-pentyl, and n-hexyl. Specific examples of the alkenyl group include vinyl, 1-propenyl, and allyl.

The first surfactant may be, for example, either an ester type (including an ester ether type) nonionic surfactant or an ether type nonionic surfactant.

Examples of the first surfactant include an ester or ether of a hydroxy compound having a polyoxy $C_{2-4}$ alkylene chain (poly $C_{2-4}$ alkylene glycol, copolymer containing different oxy $C_{2-4}$ alkylene units and including a hydroxy group at the terminal, poly $C_{2-4}$ alkylene oxide adduct of polyol, and the like). Among these, esters or ethers of hydroxy compounds having a polyoxyethylene chain (such as polyethylene glycol and polyethylene oxide adduct of polyol) are particularly preferable. As the first surfactant, an ester of a polyol is also preferable.

The polyol may be any of an aliphatic polyol, an alicyclic polyol, an aromatic polyol, a heterocyclic polyol, and the like. From the viewpoint that the first surfactant easily spreads thinly on the lead surface, non-aromatic polyols (for example, aliphatic polyols, alicyclic polyols (for example, polyhydroxycyclohexane and polyhydroxynorbornane)), and the like are preferable. As the non-aromatic polyol, for example, aliphatic diols, aliphatic polyols of triol or higher (for example, glycerin, trimethylolpropane, and pentaerythritol), sugar, and sugar alcohol are preferable. Examples of the aliphatic diol include an alkylene glycol having 5 or more carbon atoms. The alkylene glycol may be, for example, a $C_{5-14}$ alkylene glycol or a $C_{5-10}$ alkylene glycol. Examples of the sugar or sugar alcohol include sucrose, erythritol, xylitol, mannitol, and sorbitol. Note that the sugar or sugar alcohol may have either a chain structure or a cyclic structure. In the alkylene oxide adduct of the polyol, the alkylene oxide corresponds to an oxy $C_{2-4}$ alkylene unit of the first surfactant and contains at least $C_{2-4}$ alkylene oxide. From the viewpoint that the first surfactant easily has the linear structure, the polyol may be a diol.

The ether has an —$OR^2$ group obtained by etherifying the hydroxy compound: —OH groups (—OH groups composed of a hydrogen atom of a terminal group and an oxygen atom bonded to the hydrogen atom) at at least a part of terminals of the hydroxy compound (wherein $R^2$ is an organic group). In the ether, among terminals of the hydroxy compound, some terminal hydroxy groups may be etherified, or all terminal hydroxy groups may be etherified. For example, one terminal of the polyoxy $C_{2-4}$ alkylene chain of the first surfactant may be an —OH group, and the other terminal may be an —$OR^2$ group. In the —$OR^2$ group, $R^2$ specifically corresponds to the first hydrophobic group or the second hydrophobic group. For example, in polyoxyethylene lauryl ether, a polyoxyethylene chain of polyethylene glycol and a hydroxy group at one terminal correspond to a hydrophilic group, and a lauryl group ($C_{12}H_{25}$—) at a lauryl ether moiety represented by $C_{12}H_{25}$—O— corresponds to the first hydrophobic group.

The ester has an —O—C(=O)—$R^3$ group obtained by esterifying the hydroxy group: —OH groups (—OH groups composed of a hydrogen atom of a terminal group and an oxygen atom bonded to the hydrogen atom) at at least a part of terminals of the hydroxy compound or polyol (wherein $R^3$ is an organic group). In the ester, some terminal hydroxy groups of a hydroxy compound or polyol having a polyoxy $C_{2-4}$ alkylene chain may be esterified, or all terminals thereof may be esterified. The ester may be, for example, one terminal of the polyoxy $C_{2-4}$ alkylene chain of the first surfactant may be an —OH group, and the other terminal may be an —O—C(=O)—$R^3$ group. In the —O—C (=O)—$R^3$ group, $R^3$ corresponds to the first hydrophobic group or the second hydrophobic group. The ester may be, for example, a fatty acid ester. In the fatty acid ester, each of the first hydrophobic group and the second hydrophobic group of the first surfactant is derived from the fatty acid of the fatty acid ester. For example, in oleic acid monoester of polyethylene glycol (also referred to as polyoxyethylene oleate), a polyoxyethylene chain of polyethylene glycol and a hydroxy group at one terminal correspond to a hydrophilic group, and a $C_{17}H_{33}$ portion of $C_{17}H_{33}$—C(=O)— derived from oleic acid corresponds to the first hydrophobic group.

From the viewpoint of easily obtaining higher charge acceptability while suppressing the amount of overcharge to a low level, it is preferable to use at least an ester as the first surfactant. Among them, it is preferable to use at least one selected from the group consisting of a fatty acid ester of a hydroxy compound having a polyoxyethylene chain and a fatty acid ester of polyol (such as glycerin, sucrose, and sorbitol). Among such fatty acid esters, it is more preferable to use a fatty acid ester of polyethylene glycol and a fatty acid ester of a polyethylene oxide adduct of polyol (such as glycerin, sucrose, and sorbitol). It is more preferable to use at least a fatty acid ester of polyethylene glycol. The fatty acid ester of polyethylene glycol may be a monoester or a diester, or both of them may be used.

Specific examples of the ether include polyoxyethylene lauryl ether, polyoxyethylene tetradecyl ether, and polyoxyethylene cetyl ether. Specific examples of esters (the fatty acid ester) include polyethylene glycol oleate, polyethylene glycol dioleate, polyethylene glycol dilaurate, polyethylene glycol distearate, polyoxyethylene coconut oil fatty acid sorbitan, polyoxyethylene sorbitan oleate, polyoxyethylene sorbitan stearate, coconut oil fatty acid sorbitan, sorbitan oleate, and sorbitan stearate. However, the first surfactant is not limited thereto.

The negative electrode material may contain one kind or two or more kinds of the first surfactants.

From the viewpoint of more easily reducing the amount of overcharge, the HLB of the first surfactant is preferably 4 or more, and more preferably 4.3 or more. From the viewpoint of easily securing higher charge acceptability, the HLB of the first surfactant is preferably 18 or less, more preferably 10 or less or 9 or less, and still more preferably 8.5 or less.

The HLB of the first surfactant may be 4 or more (or 4.3 or more) and 18 or less, or 4 or more (or 4.3 or more) and 10 or less. From the viewpoint of an excellent balance between the charge acceptability and the amount of overcharge, the HLB of the first surfactant is preferably 4 or more (or 4.3 or more) and 9 or less, or 4 or more (or 4.3 or more) and 8.5 or less.

The first surfactant may contain, for example, a component having Mn of 20,000 or less or 10,000 or less. From the viewpoint of securing higher charge acceptability, the first surfactant preferably contains a component having Mn of 3000 or less, and may contain a component having Mn of 1500 or less or 1000 or less. The Mn of such a component may be 300 or more, 400 or more, or 500 or more. As the first surfactant, two or more components having different Mn may be used. That is, the first surfactant may have a plurality of peaks of the Mn in the distribution of the molecular weight.

The first surfactant may contain a component having Mn of 300 or more and 20,000 or less (or 10,000 or less), 300 or more and 3000 or less (or 1500 or less), 300 or more (or 400 or more) and 1000 or less, 400 or more and 20,000 or less (or 10,000 or less), 400 or more and 3000 or less (or 1500 or less), 500 or more and 20,000 or less (or 10,000 or less), 500 or more and 3000 or less (or 1500 or less), or 500 or more and 1000 or less.

The content of the first surfactant in the negative electrode material may be 8 ppm or more and may be 10 ppm or more on a mass basis. From the viewpoint of further enhancing the effect of reducing the amount of overcharge, the content of the first surfactant in the negative electrode material is preferably 30 ppm or more and more preferably 36 ppm or more on a mass basis. The content of the first surfactant in the negative electrode material is, for example, 1000 ppm or less and may be 600 ppm or less on a mass basis. From the viewpoint of easily securing higher charge acceptability, the content of the first surfactant in the negative electrode material is preferably 500 ppm or less, more preferably 400 ppm or less or 350 ppm or less, and may be 300 ppm or less on a mass basis.

The content of the first surfactant in the negative electrode material may be, on a mass basis, 8 ppm or more (or 10 ppm or more) and 1000 ppm or less, 8 ppm or more (or 10 ppm or more) and 600 ppm or less, 8 ppm or more (or 10 ppm or more) and 500 ppm or less, 8 ppm or more (or 10 ppm or more) and 400 ppm or less, 8 ppm or more (or 10 ppm or more) and 350 ppm or less, 8 ppm or more (or 10 ppm or more) and 300 ppm or less, 30 ppm or more (or 36 ppm or more) and 1000 ppm or less, 30 ppm or more (or 36 ppm or more) and 600 ppm or less, 30 ppm or more (or 36 ppm or more) and 500 ppm or less, 30 ppm or more (or 36 ppm or more) and 400 ppm or more) and 350 ppm or less, or 30 ppm or more (or 36 ppm or more) and 300 ppm or less.

(Second Surfactant)

The negative electrode material may contain the second surfactant other than the first surfactant. Examples of the second surfactant include a nonionic surfactant other than the first surfactant, a cationic surfactant, an anionic surfactant, and an amphoteric surfactant. The negative electrode material may contain one kind or two or more kinds of the second surfactants.

The larger ratio of the first surfactant to the whole surfactant contained in the negative electrode material is more preferable, and is, for example, preferably 70% by mass or more, and may be 80% by mass or more or 90% by mass or more of the whole surfactant. The ratio of the first surfactant to the whole surfactant is 100% by mass or less. The negative electrode material may contain only the first surfactant as the surfactant.

(Organic Expander)

The organic expanders are generally roughly classified into lignin compounds and synthetic organic expanders. It can also be said that the synthetic organic expander is an organic expander other than lignin compounds. Examples of the organic expander contained in the negative electrode material include a lignin compound, and a synthetic organic expander. The negative electrode material may contain one kind or two or more kinds of organic expanders.

Examples of the lignin compounds include lignin and lignin derivatives. Examples of the lignin derivative include lignin sulfonic acid or salts thereof (such as alkali metal salts (sodium salts and the like)).

The synthetic organic expander is an organic polymer containing sulfur element, and generally contains a plurality of aromatic rings in the molecule and sulfur element as a sulfur-containing group. Among the sulfur-containing groups, a sulfonic acid group or a sulfonyl group which is in a stable form is preferable. The sulfonic acid group may exist in an acid form, or may exist in a salt form like a Na salt.

At least a lignin compound may be used as the organic expander. The lignin compound tends to lower charge acceptability compared to the synthetic organic expander. However, since the negative electrode material contains the first surfactant, even when a lignin compound is used as the organic expander, the deterioration of the charge acceptability is suppressed, and high charge acceptability can be secured.

As the organic expander, the case of using a condensate containing at least a unit of an aromatic compound is also preferable. Examples of such a condensate include a condensate of an aromatic compound with an aldehyde compound (such as at least one selected from the group consisting of aldehydes (for example, formaldehyde) and condensates thereof). The organic expander may contain a unit of one kind of an aromatic compound or a unit of two or more kinds of aromatic compounds.

Note that the unit of an aromatic compound refers to a unit derived from an aromatic compound incorporated in a condensate.

Examples of the aromatic ring of the aromatic compound include a benzene ring and a naphthalene ring. When the aromatic compound has a plurality of aromatic rings, the plurality of aromatic rings may be linked by a direct bond or a linking group (for example, an alkylene group (including an alkylidene group), a sulfone group), or the like. Examples of such a structure include bisarene structures (such as biphenyl, bisphenylalkane, and bisphenylsulfone). Examples of the aromatic compound include a compound having the above-mentioned aromatic ring and at least one selected from the group consisting of a hydroxy group and an amino group. The hydroxy group or the amino group may be directly bonded to the aromatic ring, or may be bonded as an alkyl chain including a hydroxy group or an amino group. Note that the hydroxy group also includes salts of hydroxy group (—OMe). The amino group also includes salts of an amino group (specifically, salts with anions). Examples of Me include alkali metals (such as Li, K, and Na) and Group 2 metals of the periodic table (such as Ca and Mg).

As the aromatic compound, bisarene compounds [bisphenol compounds, hydroxybiphenyl compounds, bisarene compounds including an amino group (such as bisarylalkane compounds including an amino group, bisarylsulfone compounds including an amino group, and biphenyl compounds including an amino group), hydroxyarene compounds (such as hydroxynaphthalene compounds and phenol compounds), aminoarene compounds (such as aminonaphthalene compounds, aniline compounds (aminobenzenesulfonic acid, alkylaminobenzenesulfonic acid, and the like)), and the like] are preferable. The aromatic compound may further include a substituent. The organic expander may contain one or more or a plurality of residues of these compounds. As the bisphenol compound, bisphenol A, bisphenol S, bisphenol F, and the like are preferable. When the negative electrode material contains the condensate of the bisarene compound (such as a condensate with an aldehyde compound), higher charge acceptability can be secured while suppressing the amount of overcharge to a low level.

The condensate preferably contains a unit of an aromatic compound including at least a sulfur-containing group. In particular, use of a condensate containing at least a unit of a bisphenol compound including a sulfur-containing group is advantageous in securing higher charge acceptability. From the viewpoint of enhancing the effect of reducing the amount of overcharge, it is also preferable to use a condensate of a naphthalene compound including a sulfur-containing group and including at least one selected from the group consisting of a hydroxy group and an amino group with an aldehyde compound.

The sulfur-containing group may be directly bonded to the aromatic ring contained in the compound, and for example, may be bonded to the aromatic ring as an alkyl chain including a sulfur-containing group. The sulfur-containing group is not particularly limited, and examples thereof include a sulfonyl group and a sulfonic acid group or a salt thereof.

In addition, as the organic expander, for example, at least a condensate containing at least one selected from the group consisting of units of the bisarene compound and units of a monocyclic aromatic compound (hydroxyarene compound and/or aminoarene compound, or the like) may be used. The organic expander may contain at least a condensate containing a unit of a bisarene compound and a unit of a monocyclic aromatic compound (among them, hydroxyarene compound). Examples of such a condensate include a condensate of a bisarene compound and a monocyclic aromatic compound with an aldehyde compound. As the hydroxyarene compound, a phenol sulfonic acid compound (phenol sulfonic acid, a substituted product thereof, or the like) is preferable. As the aminoarene compound, aminobenzenesulfonic acid, alkylaminobenzenesulfonic acid, and the like are preferable. As the monocyclic aromatic compound, a hydroxyarene compound is preferable.

The negative electrode material may contain, for example, the organic expander (first organic expander) having a sulfur element content of 2,000 μmol/g or more among the organic expanders. Examples of the first organic expander include the synthetic organic expander describe above (such as the condensate).

The sulfur element content of the first organic expander may be 2,000 μmol/g or more, and is preferably 3,000

μmol/g or more. The upper limit of the sulfur element content of the organic expander is not particularly limited. From the viewpoint of further enhancing the effect of reducing the amount of overcharge, the sulfur element content of the first organic expander is preferably 9,000 μmol/g or less, and more preferably 8,000 μmol/g or less.

The sulfur element content of the first organic expander may be, for example, 2,000 μmol/g or more (or 3,000 μmol/g or more) and 9,000 μmol/g or less, or 2,000 μmol/g or more (or 3,000 μmol/g or more) and 8,000 μmol/g or less.

The first organic expander may contain a condensate containing a unit of an aromatic compound including a sulfur-containing group, and the condensate may contain at least a unit of a bisarene compound (such as a bisphenol compound) as the unit of the aromatic compound.

The weight average molecular weight (Mw) of the first organic expander is preferably 7,000 or more. The Mw of the first organic expander is, for example, 100,000 or less, and may be 20,000 or less.

The negative electrode material can contain, for example, the organic expander (second organic expander) having a sulfur element content of less than 2,000 μmol/g. Examples of the second organic expander include a lignin compounds and synthetic organic expanders (in particular, lignin compounds) among the organic expanders described above. The sulfur element content of the second organic expander is preferably 1,000 μmol/g or less, and may be 800 μmol/g or less. The lower limit of the sulfur element content in the second organic expander is not particularly limited, and is, for example, 400 μmol/g or more.

The Mw of the second organic expander is, for example, less than 7,000. The Mw of the second organic expander is, for example, 3,000 or more.

The negative electrode material may contain the second organic expander in addition to the first organic expander. When the first organic expander and the second organic expander are used in combination, the mass ratio thereof can be arbitrarily selected.

The content of the organic expander contained in the negative electrode material is, for example, 0.005% by mass or more and may be 0.01% by mass or more. When the content of the organic expander is in such a range, a high discharge capacity can be secured. The content of the organic expander is, for example, 1.0% by mass or less and may be 0.5% by mass or less. From the viewpoint of further enhancing the effect of suppressing the deterioration of the charge acceptability, the content of the organic expander is preferably 0.3% by mass or less, and more preferably 0.25% by mass or less.

The content of the organic expander contained in the negative electrode material may be 0.005% by mass or more (or 0.01% by mass or more) and 1.0% by mass or less, 0.005% by mass or more (or 0.01% by mass or more) and 0.5% by mass or less, 0.005% by mass or more (or 0.01% by mass or more) and 0.3% by mass or less, or 0.005% by mass or more (or 0.01% by mass or more) and 0.25% by mass or less.

(Carbonaceous Material)

As the carbonaceous material contained in the negative electrode material, carbon black, graphite, hard carbon, soft carbon, and the like can be used. Examples of the carbon black include acetylene black, furnace black, and lamp black. Furnace black also includes ketjen black (product name).

In the present specification, among the carbonaceous materials, the carbonaceous material in which an intensity ratio ID/IG of a peak (D band) appearing in a range of 1,300

$cm^{-1}$ or more and 1,350 $cm^{-1}$ or less in a Raman spectrum to a peak (G band) appearing in a range of 1,550 $cm^{-1}$ or more and 1,600 $cm^{-1}$ or less is 0 or more and 0.9 or less is referred to as graphite. The graphite may be either artificial graphite or natural graphite.

The negative electrode material may contain one kind or two or more kinds of carbonaceous materials.

Since the first surfactant also covers the surface of the carbonaceous material, a coating amount with respect to lead and lead sulfate is also affected by the specific surface area and amount of the carbonaceous material.

The specific surface area of the carbonaceous material is, for example, 0.5 $(m^2 \cdot g^{-1})$ or more, and may be 1 $(m^2 \cdot g^{-1})$ or more, or 20 $(m^2 \cdot g^{-1})$ or more. When the specific surface area is in such a range, it is easy to suppress an excessive increase in the content of the first surfactant and to secure high charge acceptability. The specific surface area of the carbonaceous material may be 300 $(m^2 \cdot g^{-1})$ or more or 400 $(m^2 \cdot g^{-1})$ or more. When the specific surface area is in such a range, the amount of overcharge tends to increase; however, even in such a case, the amount of overcharge can be reduced by combining with the first surfactant. The specific surface area of the carbonaceous material may be, for example, 1,500 $(m^2 \cdot g^{-1})$ or less, 1,000 $(m^2 \cdot g^{-1})$ or less, or 800 $(m^2 \cdot g^{-1})$ or less, and may be 200 $(m^2 \cdot g^{-1})$ or less or 150 $(m^2 \cdot g^{-1})$ or less. When the specific surface area is in such a range, the effect of reducing the amount of overcharge can be further enhanced.

The specific surface area of the carbonaceous material may be 0.5 $(m^2 \cdot g^{-1})$ or more and 1,500 $(m^2 \cdot g^{-1})$ or less (or 1,000 $(m^2 \cdot g^{-1})$ or less), 1 $(m^2 \cdot g^{-1})$ or more and 1,500 $(m^2 \cdot g^{-1})$ or less (or 1,000 $(m^2 \cdot g^{-1})$ or less), 20 $(m^2 \cdot g^{-1})$ or more and 1,500 $(m^2 \cdot g^{-1})$ or less (or 1,000 $(m^2 \cdot g^{-1})$ or less), 300 $(m^2 \cdot g^{-1})$ or more and 1,500 $(m^2 \cdot g^{-1})$ or less (or 1,000 $(m^2 \cdot g^{-1})$ or less), 400 $(m^2 \cdot g^{-1})$ or more and 1,500 $(m^2 \cdot g^{-1})$ or less (or 1,000 $(m^2 \cdot g^{-1})$ or less), 300 $(m^2 \cdot g^{-1})$ or more (or 400 $(m^2 \cdot g^{-1})$ or more) and 800 $(m^2 \cdot g^{-1})$ or less, 0.5 $(m^2 \cdot g^{-1})$ or more and 800 $(m^2 \cdot g^{-1})$ or less (or 200 $(m^2 \cdot g^{-1})$ or less), 1 $(m^2 \cdot g^{-1})$ or more and 800 $(m^2 \cdot g^{-1})$ or less (or 200 $(m^2 \cdot g^{-1})$ or less), 20 $(m^2 \cdot g^{-1})$ or more and 800 $(m^2 \cdot g^{-1})$ or less (or 200 $(m^2 \cdot g^{-1})$ or less), 0.5 $(m^2 \cdot g^{-1})$ or more and 150 $(m^2 \cdot g^{-1})$ or less, 1 $(m^2 \cdot g^{-1})$ or more and 150 $(m^2 \cdot g^{-1})$ or less, or 20 $(m^2 \cdot g^{-1})$ or more and 150 $(m^2 \cdot g^{-1})$ or less.

The specific surface area of the carbonaceous material is the BET specific surface area determined by the gas adsorption method using nitrogen gas.

The content of the carbonaceous material in the negative electrode material is, for example, 0.05% by mass or more and may be 0.10% by mass or more. The content of the carbonaceous material is, for example, 5% by mass or less and may be 3% by mass or less.

The content of the carbonaceous material in the negative electrode material may be 0.05% by mass or more and 5% by mass or less, 0.05% by mass or more and 3% by mass or less, 0.10% by mass or more and 5% by mass or less, or 0.10% by mass or more and 3% by mass or less.

(Barium Sulfate)

The content of barium sulfate in the negative electrode material is, for example, 0.05% by mass or more and may be 0.10% by mass or more. The content of barium sulfate in the negative electrode material is, for example, 3% by mass or less and may be 2% by mass or less.

The content of barium sulfate in the negative electrode material may be 0.05% by mass or more and 3% by mass or less, 0.05% by mass or more and 2% by mass or less, 0.10% by mass or more and 3% by mass or less, or 0.10% by mass or more and 2% by mass or less.

(Analysis of Negative Electrode Material or Constituent Components)

Hereinafter, a method of analyzing the negative electrode material or constituent components thereof will be described. Before measurement or analysis, the lead-acid battery in the full charge state is disassembled to obtain a negative electrode plate to be analyzed. The obtained negative electrode plate is washed with water to remove sulfuric acid from the negative electrode plate. The washing with water is performed until it is confirmed that color of a pH test paper does not change by pressing the pH test paper against the surface of the negative electrode plate washed with water. However, the washing with water is performed within two hours. The negative electrode plate washed with water is dried at 60±5° C. in a reduced pressure environment for about six hours. After drying, when the sticking member is included in the negative electrode plate, the sticking member is removed by peeling. Next, the negative electrode material is separated from the negative electrode plate to obtain a sample (hereinafter referred to as sample A). The sample A is ground as necessary and subjected to analysis.

(1) Analysis of Surfactant (1-1) Qualitative Analysis of First Surfactant (a) Analysis of Oxy $C_{2-4}$ Alkylene Unit The pulverized sample A is used. 150.0±0.1 mL of chloroform is added to 100.0±0.1 g of the sample A, and the mixture is stirred at 20±5° C. for 16 hours to extract the first surfactant. Thereafter, the solid content is removed by filtration. For a chloroform solution in which the first surfactant obtained by the extraction is dissolved or the first surfactant obtained by drying the chloroform solution, information is obtained from at least one selected from an infrared spectroscopic spectrum, an ultraviolet-visible absorption spectrum, an NMR spectrum, and LC-MS and pyrolysis GC-MS to specify the first surfactant.

Chloroform is distilled off under reduced pressure from the chloroform solution in which the first surfactant obtained by the extraction is dissolved to recover a chloroform soluble component. The chloroform soluble component is dissolved in deuterated chloroform, and a $^1$H-NMR spectrum is measured under the following conditions. In this $^1$H-NMR spectrum, when a peak is observed in a chemical shift range of 3.2 ppm or more and 3.8 ppm or less, it is found that the first surfactant has an oxy $C_{2-4}$ alkylene unit. The type of the oxy $C_{2-4}$ alkylene unit is specified from a peak splitting state.

Apparatus: type AL400 nuclear magnetic resonance spectrometer, manufactured by JEOL Ltd.

Observation frequency: 395.88 MHz

Pulse width: 6.30 s

Pulse repeating time: 74.1411 seconds

Number of integrations: 32

Measurement temperature: room temperature (20 to 35° C.)

Reference: 7.24 ppm

Sample tube diameter: 5 mm

When the integrated value of the peak in the $^1$H-NMR spectrum is determined in the qualitative analysis, two points having no significant signal are determined so as to sandwich the corresponding peak in the $^1$H-NMR spectrum, and each integrated value is calculated using a straight line connecting the two points as a baseline. For example, for the peak in which the chemical shift is present in a range of 3.2 ppm to 3.8 ppm, a straight line connecting two points of 3.2 ppm and 3.8 ppm in the spectrum is used as a baseline. For example, for a peak in which the chemical shift is present in a range of more than 3.8 ppm and 4.0 ppm or less, a straight line connecting two points of 3.8 ppm and 4.0 ppm in the spectrum is used as a baseline.

(b) Analysis of Hydrophobic Group in Ester

When the first surfactant is an ester, in (a) above, a predetermined amount of the first surfactant obtained by drying a chloroform solution in which the first surfactant obtained by extraction is dissolved is collected, and an aqueous potassium hydroxide solution is added. As a result, the first surfactant is saponified to produce a fatty acid potassium salt and a hydroxy compound. The aqueous water-soluble potassium solution is added until saponification is completed. The fatty acid potassium salt is converted to a fatty acid methyl ester by adding a solution of methanol and boron trifluoride to the resulting mixture and mixing. The resulting mixture is analyzed by pyrolysis GC-MS under the following conditions to identify the first hydrophobic group and the second hydrophobic group contained in the first surfactant.

Analyzer: high-performance general-purpose gas chromatogram GC-2014 manufactured by Shimadzu Corporation Column: DEGS (diethylene glycol succinate ester) 2.1 m Oven temperature: 180 to 120° C.

Inlet temperature: 240° C.

Detector temperature: 240° C.

Carrier gas: He (flow rate: 50 mL/min)

Injection amount: 1 μL to 2 μL (c) Analysis of Hydrophobic Group in Ether

When the first surfactant is an ester, in (a) above, a predetermined amount of the first surfactant obtained by drying a chloroform solution in which the first surfactant obtained by extraction is dissolved is collected, and hydrogen iodide is added. As a result, an iodide ($R^3I$) corresponding to the organic group ($R^3$ described above) of the ether moiety of the first surfactant is produced, and a diiodo $C_{2-4}$ alkane corresponding to the oxy $C_{2-4}$ alkylene unit is produced. The hydrogen iodide described above is added in an amount sufficient to complete the conversion of the ether to the iodide and the diiodo $C_{2-4}$ alkane. The resulting mixture is analyzed by pyrolysis GC-MS under the same conditions as in (b) above to identify the first hydrophobic group and the second hydrophobic group contained in the first surfactant.

(1-2) Quantitative Analysis of First Surfactant

An appropriate amount of the chloroform soluble component is dissolved in deuterated chloroform together with tetrachloroethane (TCE) of $m_r$ (g) measured with an accuracy of ±0.0001 g, and a $^1$H-NMR spectrum is measured. An integrated value ($S_a$) of the peak in which the chemical shift is present in the range of 3.2 to 3.8 ppm and an integrated value ($S_r$) of a peak derived from TCE are determined, and mass-based content $C_n$ (ppm) of the first surfactant in the negative electrode material is determined from the following formula.

$$C_n = S_a/S_r \times N_r/N_a \times M_a/M_r \times m_r/m \times 1{,}000{,}000$$

(wherein $M_a$ is a molecular weight of a structure showing a peak in a chemical shift range of 3.2 to 3.8 ppm (more specifically, a molecular weight of the repeating structure of oxy $C_{2-4}$ alkylene units), and $N_a$ is the number of hydrogen atoms bonded to a carbon atom of a main chain of the repeating structure. $N_r$ and $M_r$ are the number of hydrogen contained in a molecule of reference substance and the molecular weight of the reference substance, respectively, and m (g) is the mass of the negative electrode material used for extraction.)

Since the reference substance in this analysis is TCE, $N_r=2$ and $M_r=168$. In addition, m=100.

For example, when the first surfactant contains a polyoxyethylene chain, $M_a$ is 44 and $N_a$ is 4. When the polyoxy $C_{2-4}$ alkylene chain has two or more oxy $C_{2-4}$ alkylene units, $N_a$ and $M_a$ are each value obtained by averaging the $N_a$ value and the $M_a$ value of each oxy $C_{2-4}$ alkylene unit using a molar ratio (mol %) of each oxy $C_{2-4}$ alkylene unit included in the repeating structure.

In the quantitative analysis, the integrated value of the peak in the $^1$H-NMR spectrum is determined using data processing software "ALICE" manufactured by JEOL Ltd.

(1-3) Mn Measurement of First Surfactant

Using the chloroform soluble component, GPC measurement of the first surfactant is performed under the following conditions using the following apparatuses. Separately, a calibration curve (standard curve) is prepared from a plot of the Mn of the standard substance and elution time. The Mn of the first surfactant is calculated based on the standard curve and the GPC measurement result of the first surfactant. However, the first surfactant may be decomposed in the chloroform soluble component.

Analysis system: 20 A system (manufactured by Shimadzu Corporation)

Column: two columns of GPC KF-805L (manufactured by Shodex) connected in series

Column temperature: 30° C.±1C

Mobile phase: tetrahydrofuran

Flow rate: 1 mL/min.

Concentration: 0.20% by mass

Injection amount: 10 μL

Standard substance: polyethylene glycol (Mn=2,000,000, 200,000, 20,000, 2,000, 200)

Detector: differential refractive index detector (Shodex RI-201H, manufactured by Shodex)

(2) Analysis of Organic Expander (2-1) Qualitative Analysis of Organic Expander in Negative Electrode Material The pulverized sample A is immersed in a 1 mol/L sodium hydroxide aqueous solution to extract the organic expander. Next, the first organic expander and the second organic expander are separated from the extract as necessary. For each separated material containing each organic expander, insoluble components are removed by filtration, and the obtained solution is desalted, then concentrated, and dried. The desalination is performed by using a desalination column, by causing the solution to pass through an ion-exchange membrane, or by placing the solution in a dialysis tube and immersing the solution in distilled water. The solution is dried to obtain a powder sample (hereinafter, referred to as a sample B) of the organic expander.

A type of the organic expander is specified using a combination of information obtained from an infrared spectroscopic spectrum measured using the sample B of the organic expander obtained as described above, an ultraviolet-visible absorption spectrum measured by an ultraviolet-visible absorption spectrometer after the sample B is diluted with distilled water or the like, an NMR spectrum of a solution obtained by dissolving the sample B in a predetermined solvent such as heavy water, pyrolysis GC-MS capable of obtaining information on individual compounds constituting a substance, and the like.

The first organic expander and the second organic expander are separated from the extract as follows. First, the extract is measured by infrared spectroscopy, NMR, and/or GC-MS to determine whether or not a plurality of types of organic expanders are contained. Next, a molecular weight distribution is measured by GPC analysis of the extract, and if the plurality of types of organic expanders can be separated by molecular weight, the organic expander is separated by column chromatography based on a difference in molecular weight. When it is difficult to separate the organic expander due to the difference in molecular weight, one of the organic expanders is separated by a precipitation separation method using a difference in solubility that varies depending on the type of the functional group and/or the amount of the functional group of the organic expander. Specifically, an aqueous sulfuric acid solution is added dropwise to a mixture obtained by dissolving the extract in an NaOH aqueous solution to adjust the pH of the mixture, thereby aggregating and separating one of the organic expanders. The insoluble component is removed by filtration as described above from a mixture obtained by dissolving the separated material again in the NaOH aqueous solution. The remaining solution after separating one of the organic expanders is concentrated. The obtained concentrate contains the other organic expander, and the insoluble component is removed from the concentrate by filtration as described above.

(2-2) Quantitative Determination of Content of Organic Expander in Negative Electrode Material Similarly to (2-1) above, for each separated material containing the organic expander, a solution is obtained after removing the insoluble component by filtration. The ultraviolet-visible absorption spectrum of each obtained solution is measured. The content of each organic expander in the negative electrode material is determined using an intensity of a characteristic peak of each organic expander and a calibration curve prepared in advance.

When a lead-acid battery in which the content of the organic expander is unknown is obtained and the content of the organic expander is measured, a structural formula of the organic expander cannot be strictly specified, so that the same organic expander may not be used for the calibration curve. In this case, the content of the organic expander is measured using the ultraviolet-visible absorption spectrum by creating a calibration curve using a separately available organic polymer in which the ultraviolet-visible absorption spectrum, the infrared spectroscopic spectrum, the NMR spectrum, and the like exhibit similar shapes with respect to the organic expander extracted from the negative electrode of the battery.

(2-3) Content of Sulfur Element in Organic Expander

Similarly to (2-1) above, after the sample B of the organic expander is obtained, sulfur element in 0.1 g of the organic expander is converted into sulfuric acid by an oxygen combustion flask method. At this time, the sample B is burned in a flask containing an adsorbent to obtain an eluate in which sulfate ions are dissolved in the adsorbent. Next, the eluate is titrated with barium perchlorate using thorin as an indicator to determine the content ($c1$) of the sulfur element in 0.1 g of the organic expander. Next, $c1$ is multiplied by 10 to calculate the content ($\mu$mol/g) of the sulfur element in the organic expander per 1 g.

(2-4) Mw Measurement of Organic Expander

Similarly to (2-1) above, after the sample B of the organic expander is obtained, GPC measurement of the organic expander is performed under the following conditions using the following apparatuses. Separately, a calibration curve (standard curve) is prepared from a plot of Mw of the standard substance and elution time. The Mw of the organic expander is calculated based on the standard curve and the GPC measurement result of the organic expander.

GPC apparatus: Build-up GPC system SD-8022/DP-8020/AS-8020/CO-8020/UV-8020 (manufactured by Tosoh Corporation)

Column: TSKgel G4000SWXL, G2000SWXL (7.8 mm I.D.×30 cm) (manufactured by Tosoh Corporation)

Detector: UV detector, $\lambda$=210 nm

Eluent: Mixed solution of NaCl aqueous solution having a concentration of 1 mol/L: acetonitrile (volume ratio=7:3)

Flow rate: 1 mL/min.

Concentration: 10 mg/mL

Injection amount: 10 $\mu$L

Standard substance: Na polystyrene sulfonate (Mw=275, 000, 35,000, 12,500, 7,500, 5,200, 1,680)

(3) Analysis of Carbonaceous Material (3-1) Separation and Quantitative Determination of Carbonaceous Material The pulverized sample A is used. 30 mL of a nitric acid aqueous solution at a concentration of 60% by mass is added per 5 g of the sample A, and the mixture is heated at 70° C.±5° C.±10 g of disodium ethylenediaminetetraacetate, 30 mL of ammonia water having a concentration of 28% by mass, and 100 mL of water are added per 5 g of the sample A, and heating is continued to dissolve a soluble component. The sample thus pretreated is collected by filtration. The collected sample is passed through a sieve with an opening of 500 $\mu$m to remove components having a large size such as a reinforcing material, and components having passed through the sieve are collected as the carbonaceous materials.

The content of the carbonaceous material in the negative electrode material is determined by measuring the mass of the carbonaceous material separated by the above procedure and calculating a ratio (% by mass) of a total of the mass in the pulverized sample.

(3-2) BET Specific Surface Area of Carbonaceous Material

The BET specific surface area of the carbonaceous material is determined using a BET equation by the gas adsorption method using the carbonaceous material separated by the procedure of (3-1) described above. The carbonaceous material is pretreated by heating at a temperature of 150° C. for 1 hour in a nitrogen flow for moisture removal. Using the pretreated carbonaceous material, the BET specific surface area of the carbonaceous material is determined by the following apparatus under the following conditions.

Measuring apparatus: TriStar 3000 manufactured by Micromeritics Instrument Corp.

Adsorption gas: nitrogen gas having a purity of 99.99% or more

Adsorption temperature: liquid nitrogen boiling point temperature (77 K)

Method for calculating BET specific surface area: in accordance with 7.2 of JIS Z 8830:2013

(4) Quantitative Determination of Barium Sulfate

To 10 g of the pulverized sample A, 50 ml of nitric acid having a concentration of 20% by mass is added and heated for about 20 minutes to dissolve the lead component as lead ions. The resulting solution is filtered, and solids such as carbonaceous materials and barium sulfate are filtered off.

The obtained solid is dispersed in water to form a dispersion, and then components except for the carbonaceous material and barium sulfate (e.g., reinforcing material) are removed from the dispersion by using a sieve. Next, the dispersion is subjected to suction filtration using a membrane filter with its mass measured in advance, and the membrane filter is dried with the filtered sample in a dryer at 110° C.±5° C. The filtered sample is a mixed sample of the carbonaceous material and barium sulfate. By subtracting the mass of the membrane filter from the total mass of a dried mixed sample (hereinafter, referred to as a sample C) and the membrane filter, a mass ($M_m$) of the sample C is measured. Thereafter, the sample C is placed in a crucible together with a membrane filter and is burned and incinerated at 1,300° C. or higher. The residue remaining is barium oxide. The mass ($M_B$) of barium sulfate is determined by converting the mass of barium oxide to the mass of barium sulfate.

(Others)

The negative electrode plate can be formed in such a manner that a negative electrode current collector is coated or filled with a negative electrode paste, which is then cured and dried to fabricate a non-formed negative electrode plate, and thereafter, the non-formed negative electrode plate is formed. The negative electrode paste is prepared, for example, by adding water and sulfuric acid (or sulfuric acid aqueous solution) to a lead powder, the first surfactant, and if necessary, at least one selected from the group consisting of an organic expander, a carbonaceous material, and other additives, and mixing the mixture. At the time of curing, it is preferable to cure the non-formed negative electrode plate at a higher temperature than room temperature and high humidity.

The formation can be performed by charging the element in the state where the element including the non-formed negative electrode plate immersed in the electrolyte solution containing sulfuric acid in the container of the lead-acid battery. However, the formation may be performed before the lead-acid battery or the element is assembled. The formation produces spongy lead.

(Positive Electrode Plate)

The positive electrode plate of a lead-acid battery can be classified into a paste type, a clad type, and the like. Either a paste-type or a clad-type positive electrode plate may be used. The paste-type positive electrode plate includes a positive electrode current collector and a positive electrode material. The configuration of the clad-type positive electrode plate is as described above.

The positive electrode current collector may be formed by casting lead (Pb) or a lead alloy, or may be formed by processing a lead sheet or a lead alloy sheet. Examples of the processing method include expanding processing and punching processing. It is preferable to use a grid-shaped current collector as the positive electrode current collector because it is easy to support the positive electrode material.

As a lead alloy used for the positive electrode current collector, a Pb—Sb-based alloy, a Pb—Ca-based alloy, or a Pb—Ca—Sn-based alloy are preferred in terms of corrosion resistance and mechanical strength. The positive electrode current collector may include a surface layer. The surface layer and the inner layer of the positive electrode current collector may have different compositions. The surface layer may be formed in a part of the positive electrode current collector. The surface layer may be formed only on the grid part, only on the lug part, or only on the frame rib part of the positive electrode current collector.

The positive electrode material contained in the positive electrode plate contains a positive active material (lead dioxide or lead sulfate) that exhibits a capacity through a redox reaction. The positive electrode material may contain another additive as needed.

A non-formed paste-type positive electrode plate is obtained by filling a positive electrode current collector with a positive electrode paste, and curing and drying the paste. The positive electrode paste is prepared by mixing lead powder, an additive, water, and sulfuric acid. Anon-formed clad-type positive electrode plate is formed by filling a porous tube, into which a spine connected by a current collector is inserted with a lead powder or a slurry-like lead powder, and joining a plurality of tubes with a joint (spine protector). Thereafter, the positive electrode plate is obtained by forming the non-formed positive electrode plates.

The formation can be performed by charging the element in the state where the element including the non-formed positive electrode plate immersed in the electrolyte solution containing sulfuric acid in the container of the lead-acid battery. However, the formation may be performed before the lead-acid battery or the element is assembled.

(Separator)

The separator can be disposed between the negative electrode plate and the positive electrode plate. As the separator, at least one selected from a nonwoven fabric and a microporous membrane, and the like are used.

The nonwoven fabric is a mat in which fibers are intertwined without being woven and is mainly made of fibers. In the nonwoven fabric, for example, 60% by mass or more of the nonwoven fabric is formed of fibers. As the fibers, there can be used glass fibers, polymer fibers (such as polyolefin fiber, acrylic fiber, and polyester fiber (polyethylene terephthalate fiber, or the like)), pulp fibers, and the like. Among them, glass fibers are preferable. The nonwoven fabric may contain components other than the fibers (for example, an acid resistant inorganic powder and a polymer as a binder) and the like.

On the other hand, the microporous film is a porous sheet mainly made of components except for fiber components and is obtained by, for example, extrusion molding a composition containing, for example, a pore-forming additive into a sheet shape and then removing the pore-forming additive to form pores. The microporous film is preferably made of a material having acid resistance and is preferably composed mainly of a polymer component. As the polymer component, a polyolefin (a polyethylene, a polypropylene, etc.) is preferable. Examples of the pore-forming additive include at least one selected from the group consisting of a polymer powder and oil.

The separator may be, for example, made of only a nonwoven fabric or made of only a microporous film. The separator may be, when required, a laminate of a nonwoven fabric and a microporous film, a laminate of different or the same kind of materials, or a laminate of different or the same kind of materials in which recesses and projections are engaged to each other.

The separator may have a sheet shape or may be formed in a bag shape. One sheet-like separator may be disposed between the positive electrode plate and the negative electrode plate. Further, the electrode plate may be disposed so as to be sandwiched by one sheet-like separator in a folded state. In this case, the positive electrode plate sandwiched by the folded sheet-like separator and the negative electrode plate sandwiched by the folded sheet-like separator may be overlapped, or one of the positive electrode plate and the negative electrode plate may be sandwiched by the folded sheet-like separator and overlapped with the other electrode plate. Also, the sheet-like separator may be folded into a bellows shape, and the positive electrode plate and the negative electrode plate may be sandwiched by the bellows-shaped separator such that the separator is interposed therebetween. When the separator folded in a bellows shape is used, the separator may be disposed such that the folded part is along the horizontal direction of the lead-acid battery (e.g., such that the bent part may be parallel to the horizontal direction), and the separator may be disposed such that the folded part is along the vertical direction (e.g., such that the bent part is parallel to the vertical direction). In the separator folded in the bellows shape, recesses are alternately formed on both main surface sides of the separator. Since the lug parts are usually formed on the upper part of the positive electrode plate and the negative electrode plate, when the separator is disposed such that the folded parts are along the horizontal direction of the lead-acid battery, the positive electrode plate and the negative electrode plate are each disposed only in the recess on one main surface side of the separator (i.e., a double separator is interposed between the adjacent positive and negative electrode plates). When the separator is disposed such that the folded part is along the vertical direction of the lead-acid battery, the positive electrode plate can be housed in the recess on one main surface side, and the negative electrode plate can be housed in the recess on the other main surface side (i.e., the separator can be interposed singly between the adjacent positive and negative electrode plates). When the bag-shaped separator is used, the bag-shaped separator may house the positive electrode plate or may house the negative electrode plate.

(Electrolyte Solution)

The electrolyte solution is an aqueous solution containing sulfuric acid and may be gelled as necessary.

The first surfactant may be contained in the electrolyte solution.

The electrolyte solution may contain cations (for example, metal cations) and/or anions (for example, anions other than sulfate anions (such as phosphate ions)) if necessary. Examples of the metal cation include at least one selected from the group consisting of a Na ion, a Li ion, a Mg ion, and an Al ion.

The specific gravity of the electrolyte solution in the lead-acid battery in the full charge state at 20° C. is, for example, 1.20 or more and may be 1.25 or more. The specific gravity of the electrolyte solution at 20° C. is 1.35 or less and preferably 1.32 or less.

The specific gravity of the electrolyte solution at 20° C. may be 1.20 or more and 1.35 or less, 1.20 or more and 1.32 or less, 1.25 or more and 1.35 or less, or 1.25 or more and 1.32 or less.

(Others)

The lead-acid battery can be obtained by a manufacturing method including a step of storing an element and an electrolyte solution in a cell chamber of a container. Each cell of the lead-acid battery includes an element and an electrolyte solution stored in each cell chamber. The element is assembled by stacking a positive electrode plate, a negative electrode plate, and a separator such that the separator is interposed between the positive electrode plate and the negative electrode plate before the element is stored in the cell chamber. The positive electrode plate, the negative electrode plate, the electrolyte solution, and the separator are each prepared before the element is assembled. A method of manufacturing the lead-acid battery may include a step of forming at least one of the positive electrode plate and the negative electrode plate as necessary after a step of storing the element and the electrolyte solution in the cell chamber.

The number of plates in the element may be one or two or more. When the element includes two or more negative electrode plates, if the condition that the negative electrode material contains the first surfactant in the above content is satisfied in at least one negative electrode plate, the effect of suppressing the deterioration of the charge acceptability for the negative electrode plate can be obtained, and the effect of reducing the amount of overcharge can be obtained according to the number of such negative electrode plates. From the viewpoint of further suppressing the deterioration of the charge acceptability and securing a high effect of reducing the amount of overcharge, it is preferable that 50% or more (more preferably 80% or more or 90% or more) of the number of negative electrode plates included in the element satisfy the above condition. Among the negative electrode plates included in the element, a ratio of the negative electrode plates satisfying the above condition is 100% or less. All negative electrode plates included in the element may satisfy the above condition.

When the lead-acid battery includes two or more cells, the elements of at least some cells may include the negative electrode plate satisfying the condition as described above. From the viewpoint of further suppressing the deterioration of the charge acceptability and securing a high effect of reducing the amount of overcharge, it is preferable that 50% or more (more preferably 80% or more or 90% or more) of the number of cells contained in the lead-acid battery include the element including the negative electrode plate satisfying the above condition. Among the cells included in the lead-acid battery, a ratio of the cells including the element including the negative electrode plate satisfying the above condition is 100% or less. It is preferable that all elements included in the lead-acid battery include the negative electrode plate satisfying the above condition.

FIG. 1 shows an appearance of an example of a lead-acid battery according to an embodiment of the present invention.

A lead-acid battery 1 includes a container 12 that houses an element 11 and an electrolyte solution (not shown). An inside of the container 12 is partitioned by partitions 13 into a plurality of cell chambers 14. Each of the cell chambers 14 contains one element 11. An opening of the container 12 is closed with a lid 15 including a negative electrode terminal 16 and a positive electrode terminal 17. A vent plug 18 is provided in the lid 15 for each cell chamber. At the time of water addition, the vent plug 18 is removed to supply a water addition liquid. The vent plug 18 may have a function of discharging gas generated in the cell chamber 14 to the outside of the battery.

The element 11 is configured by stacking a plurality of negative electrode plates 2 and a plurality of positive electrode plates 3 with a separator 4 interposed therebetween. At this point, the bag-shaped separator 4 accommodating the negative electrode plate 2 is illustrated, but the form of the separator is not particularly limited. In the cell chamber 14 located at one end of the container 12, a negative electrode shelf 6 connecting the plurality of negative electrode plates 2 in parallel is connected to a penetrating connection body 8, and a positive electrode shelf 5 connecting the plurality of positive electrode plates 3 in parallel is connected to a positive pole 7. The positive pole 7 is connected to the positive electrode terminal 17 outside the lid 15. In the cell chamber 14 located at the other end of the container 12, a negative pole 9 is connected to the negative electrode shelf 6, and the penetrating connection body 8 is connected to the positive electrode shelf 5. The negative pole 9 is connected to the negative electrode terminal 16 outside the lid 15. Each penetrating connection body 8 passes through a through-hole made in the partition 13 to connect the elements 11 of the adjacent cell chambers 14 in series.

The positive electrode shelf 5 is formed by welding the lug parts, provided on the upper parts of the respective positive electrode plates 3, to each other by a cast-on-strap method or a burning method. The negative electrode shelf 6 is also formed by welding the lug parts, provided on the upper parts of the respective negative electrode plates 2, to each other in accordance with the case of the positive electrode shelf 5.

The lid 15 of the lead-acid battery has a single structure (single lid), but is not limited to the illustrated examples. The lid 15 may have, for example, a double structure including an inner lid and an outer lid (or an upper lid). The lid having the double structure may have a reflux structure between the inner lid and the outer lid for returning the electrolyte solution into the battery (inside the inner lid) through a reflux port provided in the inner lid.

In the present specification, each of the amount of overcharge and the charge acceptability is evaluated by the following procedure. A test battery used for the evaluation has a rated voltage of 2 V/cell and a rated 5-hour rate capacity of 32 Ah.

(2) Evaluation (a) Amount of Overcharge

The amount of overcharge is evaluated by the following procedure using the test battery in the full charge state. Specifically, the test battery in the full charge state is charged at a constant voltage of 2.4 V/cell for 168 hours in a water bath at a temperature of $60\pm3^\circ$ C. An integrated value (Ah) of the amount of overcharge is obtained by multiplying a charge current (A) at the time of the constant voltage charge by a charging time (h). The amount of overcharge is evaluated based on the integrated value.

(b) Charge Acceptability

A 10 second electric quantity is measured using the test battery in the full charge state. Specifically, the test battery is discharged at 6.4 A for 30 minutes and left for 16 hours. Thereafter, the test battery is charged at a constant voltage of 2.42 V/cell while the upper limit of the current is 200 A, and an integrated electric quantity for 10 seconds (10 second electric quantity) at this time is measured. Both operations are performed in a water bath at $25^\circ$ C.$\pm2^\circ$ C. The integrated electric quantity for 10 seconds is used as an index for evaluation of the charge acceptability.

The lead-acid battery according to one aspect of the present invention will be described below.

(1) A lead-acid battery including at least one cell including an element and an electrolyte solution, in which the element includes a positive electrode plate, a negative electrode plate, a separator interposed between the negative electrode plate and the positive electrode plate, the negative electrode plate includes a negative electrode material, the negative electrode material contains a nonionic surfactant (first surfactant) including one or more hydrophobic groups and one or more hydrophilic groups, at least one of the hydrophobic groups is a long-chain aliphatic hydrocarbon group (first hydrophobic group) having 8 or more carbon atoms, and a content of the nonionic surfactant in the negative electrode material is 8 ppm or more on a mass basis.

(2) In (1) above, the number of the first hydrophobic groups may be 4 or less, 3 or less, or 2 or less.

(3) In (1) or (2) above, the number of carbon atoms of the first hydrophobic group may be 10 or more, 11 or more, 14 or more, 16 or more, or 17 or more.

(4) In any one of (1) to (3) above, the number of carbon atoms of the first hydrophobic group may be 30 or less, 26 or less, 24 or less, or 22 or less.

(5) In any one of (1) to (4) above, the first surfactant may include one or more second hydrophobic groups other than the first hydrophobic group.

(6) In (5) above, the number of the second hydrophobic groups may be 4 or less, 3 or less, or 2 or less.

(7) In any one of (1) to (6) above, the number of the hydrophilic groups may be 6 or less or 4 or less.

(8) In any one of (1) to (7) above, the number of the hydrophilic groups may be 2 or more.

(9) In any one of (1) to (8) above, the first surfactant may contain a polyoxy $C_{2-4}$ alkylene chain.

(10) In (9) above, in one polyoxy $C_{2-4}$ alkylene chain, the number of repetitions of an oxy $C_{2-4}$ alkylene unit may be 2 or more or 5 or more.

(11) In (9) or (10) above, in one polyoxy $C_{2-4}$ alkylene chain, the number of repetitions of the oxy $C_{2-4}$ alkylene unit may be 300 or less, 200 or less, 50 or less, 20 or less, or 10 or less.

(12) In any one of (1) to (11) above, at least one of the hydrophilic groups may contain a polyoxyethylene chain.

(13) In any one of (1) to (12) above, the first surfactant contains a fatty acid ester of a hydroxy compound, and the long-chain aliphatic hydrocarbon group may be derived from a fatty acid of the fatty acid ester.

(14) In (13) above, the first surfactant may contain at least one selected from the group consisting of a fatty acid ester of polyethylene glycol, a fatty acid ester of a polyethylene oxide adduct of a polyol, and a fatty acid ester of a polyol.

(15) In any one of (1) to (14) above, the first surfactant may contain at least one selected from the group consisting of polyethylene glycol oleate, polyethylene glycol dioleate, polyethylene glycol dilaurate, polyethylene glycol distearate, polyoxyethylene coconut oil fatty acid sorbitan, polyoxyethylene sorbitan oleate, polyoxyethylene sorbitan stearate, coconut oil fatty acid sorbitan, sorbitan oleate, and sorbitan stearate.

(16) In any one of (1) to (15) above, HLB of the first surfactant may be 4 or more or 4.3 or more.

(17) In any one of (1) to (16) above, the HLB of the first surfactant may be 18 or less, 10 or less, 9 or less, or 8.5 or less.

(18) In any one of (1) to (17) above, the first surfactant may contain a component having Mn of 300 or more, 400 or more, or 500 or more.

(19) In (18) above, the Mn of the component may be 20,000 or less, 10,000 or less, 3,000 or less, 1,500 or less, or 1,000 or less.

(20) In any one of (1) to (19) above, a content of the first surfactant in the negative electrode material may be 8 ppm or more, 10 ppm or more, 30 ppm or more, or 36 ppm or more on a mass basis.

(21) In any one of (1) to (20) above, the content of the first surfactant in the negative electrode material may be 1,000 ppm or less, 600 ppm or less, 500 ppm or less, 400 ppm or less, 350 ppm or less, or 300 ppm or less on a mass basis.

(22) In any one of (1) to (21) above, the negative electrode material may contain an organic expander.

(23) In (22) above, the organic expander may contain a first organic expander having a sulfur element content of 2,000 $\mu$mol/g or more or 3,000 $\mu$mol/g or more.

(24) In (23) above, the sulfur element content of the first organic expander may be 9,000 $\mu$mol/g or less, or 8,000 $\mu$mol/g or less.

(25) In (23) or (24) above, Mw of the first organic expander may be 7,000 or more.

(26) In any one of (23) to (25) above, the Mw of the first organic expander may be 100,000 or less, or 20,000 or less.

(27) In any one of (1) to (26) above, the negative electrode material (or the organic expander or the first organic expander) may contain a condensate of a bisarene compound.

(28) In any one of (1) to (27) above, the negative electrode material (or the organic expander) may contain a lignin compound.

(29) In any one of (22) to (28) above, a content of the organic expander in the negative electrode material may be 0.005% by mass or more or 0.01% by mass or more.

(30) In any one of (22) to (29) above, the content of the organic expander in the negative electrode material may be 1.0% by mass or less, 0.5% by mass or less, 0.3% by mass or less, or 0.25% by mass or less.

(31) In any one of (1) to (30) above, the negative electrode material may contain a carbonaceous material.

(32) In (31) above, a specific surface area of the carbonaceous material may be 0.5 $(m^2 \cdot g^{-1})$ or more, 1 $(m^2 \cdot g^{-1})$ or more, 20 $(m^2 \cdot g^{-1})$ or more, 300 $(m^2 \cdot g^{-1})$ or more, or 400 $(m^2 \cdot g^{-1})$ or more.

(33) In (31) or (32) above, the specific surface area of the carbonaceous material may be 1,500 $(m^2 \cdot g^{-1})$ or less, 1,000 $(m^2 \cdot g^{-1})$ or less, 800 $(m^2 \cdot g^{-1})$ or less, 200 $(m^2 \cdot g^{-1})$ or less, or 150 $(m^2 \cdot g^{-1})$ or less.

(34) In any one of (31) to (33) above, the content of the carbonaceous material in the negative electrode material may be 0.05% by mass or more, or 0.10% by mass or more.

(35) In any one of (31) to (34) above, the content of the carbonaceous material in the negative electrode material may be 5% by mass or less, or 3% by mass or less.

(36) In any one of (1) to (35) above, the negative electrode material may contain barium sulfate.

(37) In (36) above, the content of the barium sulfate in the negative electrode material may be 0.05% by mass or more or 0.10% by mass or more.

(38) In (36) or (37) above, the content of barium sulfate in the negative electrode material may be 3% by mass or less or 2% by mass or less.

(39) In any one of (1) to (38) above, a specific gravity of the electrolyte solution at 20° C. in the lead-acid battery in a full charge state may be 1.20 or more or 1.25 or more.

(40) In any one of (1) to (39) above, the specific gravity of the electrolyte solution at 20° C. in the lead-acid battery in the full charge state may be 1.35 or less or 1.32 or less.

EXAMPLES

Hereinafter, the present invention is specifically described on the basis of examples and comparative examples, but the present invention is not limited to the following examples.
<<Lead-Acid Batteries E1 to E20 and C1 to C7>>
(1) Preparation of Lead-Acid Battery
(a) Preparation of Negative Electrode Plate
A lead powder as a raw material, barium sulfate, carbon black, a surfactant shown in the table, and an organic expander shown in the table are mixed with an appropriate amount of a sulfuric acid aqueous solution to obtain a negative electrode paste. At this time, the components are mixed so that the content of the first surfactant in the negative electrode material, which is determined by the procedure described above, is the value shown in the table, the content of the organic expander is 0.1% by mass, the content of barium sulfate is 0.4% by mass, and the content of carbon black is 0.2% by mass. A mesh portion of an expanded grid made of a Pb—Ca—Sn alloy is filled with the negative electrode paste, which is then cured and dried to obtain a non-formed negative electrode plate.

As the organic expander shown in the table, the following components are used.

(e1) Lignin: Sodium ligninsulfonate (sulfur element content: 600 µmol/g, Mw: 5,500)

(e2) Condensate of bisphenol: condensate of a bisphenol compound including sulfonic acid group introduced with formaldehyde (sulfur element content: 5,000 µmol/g, Mw: 9,600)

(b) Preparation of Positive Electrode Plate

Lead powder as raw material is mixed with a sulfuric acid aqueous solution to obtain a positive electrode paste. A mesh portion of an expanded grid made of a Pb—Ca—Sn alloy is filled with the positive electrode paste, which is then cured and dried to obtain a non-formed positive electrode plate.

(c) Preparation of lead-acid battery

A lead-acid battery having a rated voltage of 2 V/cell and a rated 5-hour rate capacity of 32 Ah is fabricated. An element of the lead-acid battery includes seven positive electrode plates and seven negative electrode plates. The negative electrode plate is housed in a bag-shaped separator formed of a polyethylene microporous film, and alternately stacked with the positive electrode plate to form the element. The element is housed in a polypropylene container together with an electrolyte solution (sulfuric acid aqueous solution), and subjected to formation in the container to prepare a flooded-type lead-acid battery. The specific gravity of the electrolyte solution in the lead-acid battery in the full charge state at 20° C. is 1.28.

(2) Evaluation (a) Amount of Overcharge

For the lead-acid battery, the integrated value of the amount of overcharge is obtained by the procedure described above. The amount of overcharge of each lead-acid battery is evaluated by a ratio (%) when the integrated value of the amount of overcharge of a lead-acid battery C1 is 100.

(b) Charge Acceptability

For the lead-acid battery, the integrated electric quantity for 10 seconds is measured by the procedure described above. The charge acceptability of each lead-acid battery is evaluated by a ratio when the integrated electric quantity of the lead-acid battery C1 is 100.

Tables 1 to 4 illustrate the results. In the table, a value of a ratio (A)/(B) of an evaluation result (A) of the charge acceptability to an evaluation result (B) of the amount of overcharge is also illustrated. When the ratio (A)/(B) is 1 or less, it indicates that a balance between high charge acceptability and a small amount of overcharge is excellent. In the table, the Mn of the surfactant is the Mn of the surfactant used for preparing the negative electrode material. E1 to E20 are examples, and C1 to C7 are comparative examples. Table 4 also illustrates the specific surface area of the carbonaceous material contained in the negative electrode material.

TABLE 1

| Battery No. | Surfactant | | | | | | | | | Amount of overcharge (=A) (%) | Charge acceptability (=B) (%) | A/B |
|---|---|---|---|---|---|---|---|---|---|---|---|---|
| | First hydrophobic group | | Hydro-philic group | Number of repetitions of OE | | | Content | | | | |
| | Type | Number of carbon atoms | Number | | | Mn | HLB | (mass ppm) | Organic expander | | | |
| C1 | — | — | — | — | — | — | — | 0 | Lignin | 100 | 100 | 1.00 |
| C2 | Tetramethylammonium chloride | — | — | — | — | — | — | 36 | Lignin | 98 | 105 | 0.93 |
| C3 | Tetrapropylammonium chloride | — | — | — | — | — | — | | | 103 | 118 | 0.87 |
| C4 | PEG caprate | 7 | 1 | POE | 6 | 400 | 10 | | | 100 | 100 | 1.00 |
| E1 | PEG oleate | 17 | 1 | POE | 5 | 500 | 8.4 | 36 | Lignin | 82 | 98 | 0.84 |
| E2 | PEG distearate | 17 | 2 | POE | 6 | 800 | 7.3 | | | 84 | 100 | 0.84 |
| E3 | PEG dilaurate | 11 | 2 | POE | 4 | 630 | 6.6 | | | 86 | 103 | 0.83 |
| E4 | PEG dioleate | 17 | 2 | POE | 8 | 880 | 8.4 | | | 82 | 108 | 0.76 |
| E5 | PEG distearate | 17 | 2 | POE | 190 | 10000 | 18 | | | 70 | 59 | 1.19 |
| E6 | Coconut oil fatty acid sorbitan | 8~18 | 1 | OH | — | — | 8.6 | | | 85 | 95 | 0.89 |
| E7 | Sorbitan stearate | 17 | 1 | OH | — | 400 | 4.7 | | | 85 | 98 | 0.87 |
| E8 | Sorbitan oleate | 17 | 1 | OH | — | 400 | 4.3 | | | 83 | 100 | 0.83 |
| E9 | POE lauryl ether | 12 | 1 | POE | 7 | 490 | 12.4 | | | 70 | 56 | 1.25 |
| E10 | POE alkylether | 12~14 | 1 | POE | 12 | — | 14.5 | | | 70 | 61 | 1.15 |

OE: oxyethylene unit

PEG: polyethylene glycol

POE: polyoxyethylene

As illustrated in Table 1, when the negative electrode material contains tetramethylammonium chloride or tetrapropylammonium chloride as the second surfactant other than the first surfactant, the charge acceptability is improved as compared with the case where the negative electrode material does not contain a surfactant; however, the amount of overcharge cannot be reduced, or the effect of reducing the amount of overcharge is very low (comparison between C1 and C2 and C3). However, when the negative electrode material contains the first surfactant, it is possible to reduce the amount of overcharge while securing relatively high charge acceptability (E1 to E10).

From the viewpoint of easily securing higher charge acceptability, the negative electrode material preferably contains an ester type (including an ester ether type) first surfactant. From the same viewpoint, the HLB of the first surfactant is preferably 10 or less or 9 or less, and more preferably 8.5 or less.

TABLE 2

| Battery No. | First surfactant | | | Amount of overcharge (=A) (%) | Charge acceptability (=B) (%) | A/B |
|---|---|---|---|---|---|---|
| | Type | Content (mass ppm) | Organic expander | | | |
| C1 | — | 0 | Lignin | 100 | 100 | 1.00 |
| E1 | PEG oleate | 36 | Lignin | 87 | 98 | 0.89 |
| E11 | | 72 | | 84 | 94 | 0.89 |
| E12 | | 150 | | 76 | 83 | 0.92 |
| E13 | | 300 | | 67 | 70 | 0.96 |
| E14 | | 500 | | 52 | 59 | 0.88 |

From the viewpoint of easily securing higher charge acceptability, the content of the first surfactant in the negative electrode material is preferably 600 ppm or less or 500 ppm or less, more preferably 400 ppm or less or 350 ppm or less, and may be 300 ppm or less. From the viewpoint of further reducing the amount of overcharge, the content of the first surfactant in the negative electrode material is preferably 30 ppm or more and may be 36 ppm or more.

TABLE 3

| Battery No. | First surfactant | | Organic expander | Amount of overcharge (=A) (%) | Charge acceptability (=B) (%) | A/B |
| | Type | Content (mass ppm) | | | | |
|---|---|---|---|---|---|---|
| C1 | — | 0 | Lignin | 100 | 100 | 1.00 |
| E12 | PEG oleate | 150 | Lignin | 76 | 83 | 0.92 |
| E13 | | 300 | | 67 | 70 | 0.96 |
| E14 | | 500 | | 52 | 59 | 0.88 |
| C5 | | 0 | Bisphenol condensate | 100 | 108 | 0.93 |
| E15 | PEG oleate | 150 | Bisphenol | 76 | 94 | 0.81 |
| E16 | | 300 | condensate | 67 | 83 | 0.81 |
| E17 | | 500 | | 52 | 70 | 0.74 |

From Table 3, when the condensate of the bisarene compound is used as the organic expander, higher charge acceptability can be secured as compared with the case of using a lignin compound.

TABLE 4

| Battery No. | First surfactant | | Organic expander | Specific surface area of carbonaceous material (m²/g) | Amount of overcharge (=A) (%) | Charge acceptability (=B) (%) | A/B |
| | Type | Content (mass ppm) | | | | | |
|---|---|---|---|---|---|---|---|
| C6 | — | — | Lignin | 26 | 92 | 95 | 0.97 |
| C1 | | | | 69 | 100 | 100 | 1.00 |
| C7 | | | | 745 | 115 | 110 | 1.05 |
| E19 | PEG oleate | 150 | Lignin | 26 | 67 | 80 | 0.84 |
| E12 | | | | 69 | 76 | 83 | 0.92 |
| E20 | | | | 745 | 89 | 93 | 0.96 |

As illustrated in Table 4, when the negative electrode material does not contain the first surfactant, as the specific surface area of the carbonaceous material increases, the charge acceptability increases; however, the amount of overcharge tends to increase. When the negative electrode material contains the first surfactant, it is possible to reduce the amount of overcharge while securing relatively high charge acceptability even when the specific surface area of the carbonaceous material increases.

INDUSTRIAL APPLICABILITY

The lead-acid battery according to one aspect of the present invention is suitable for use in an idling stop vehicle as, for example, a lead-acid battery for IS that is charged and discharged under PSOC conditions. The lead-acid battery can be suitably used as, for example, a power source for starting a vehicle (automobiles, motorcycles, etc.), and an industrial energy storage apparatus (for example, a power source of an electric vehicle (such as forklift) or the like). Note that these are merely illustrative, and the application of the lead-acid battery is not limited thereto.

INDUSTRIAL APPLICABILITY

1: lead-acid battery
2: negative electrode plate
3: positive electrode plate
4: separator
5: positive electrode shelf
6: negative electrode shelf
7: positive pole
8: penetrating connection body
9: negative pole
11: element
12: container
13: partition
14: cell chamber
15: lid
16: negative electrode terminal
17: positive electrode terminal
18: vent plug

The invention claimed is:

1. A lead-acid battery comprising at least one cell including an element and an electrolyte solution,
    wherein the element includes a positive electrode plate, a negative electrode plate, a separator interposed between the negative electrode plate and the positive electrode plate,
    the negative electrode plate includes a negative electrode material,
    the negative electrode material contains a nonionic surfactant including one or more hydrophobic groups and one or more hydrophilic groups,
    at least one of the hydrophobic groups is a long-chain aliphatic hydrocarbon group having 8 or more carbon atoms, and
    a content of the nonionic surfactant in the negative electrode material is 8 ppm or more on a mass basis.

2. The lead-acid battery according to claim 1, wherein the nonionic surfactant has an HLB of 4 or more.

3. The lead-acid battery according to claim 1, wherein the nonionic surfactant has an HLB of 18 or less.

4. The lead-acid battery according to claim 1, wherein
    the nonionic surfactant contains a fatty acid ester of a hydroxy compound, and
    the long-chain aliphatic hydrocarbon group is derived from a fatty acid of the fatty acid ester.

5. The lead-acid battery according to claim 4, wherein the nonionic surfactant contains at least one selected from the group consisting of a fatty acid ester of polyethylene glycol, a fatty acid ester of a polyethylene oxide adduct of a polyol, and a fatty acid ester of a polyol.

6. The lead-acid battery according to claim 1, wherein at least one of the hydrophilic groups contains a polyoxyethylene chain.

7. The lead-acid battery according to claim 1, wherein the number of carbon atoms of the long-chain aliphatic hydrocarbon group is 26 or less.

8. The lead-acid battery according to claim 1, wherein the content of the nonionic surfactant in the negative electrode material is 30 ppm or more on a mass basis.

9. The lead-acid battery according to claim 1, wherein the content of the nonionic surfactant in the negative electrode material is 600 ppm or less on a mass basis.

10. The lead-acid battery according to claim 1, wherein the negative electrode material contains a condensate of a bisarene compound.

\* \* \* \* \*